(12) United States Patent
Zhou et al.

(10) Patent No.: US 12,724,427 B2
(45) Date of Patent: Sep. 1, 2026

(54) CONTROL METHOD FOR ROBOTIC POOL CLEANER AND ROBOTIC POOL CLEANER

(71) Applicant: Tuhui Shengchuang Enterprise Management (Suzhou) Partnership (Limited Partnership), Suzhou (CN)

(72) Inventors: Wenting Zhou, Suzhou (CN); Hua Liu, Suzhou (CN); Tianjie Cui, Suzhou (CN); Pengfei Lin, Suzhou (CN)

(73) Assignee: Wavefuture Robotics Technology (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 19/372,922

(22) Filed: Oct. 29, 2025

(65) Prior Publication Data

US 2026/0211422 A1 Jul. 23, 2026

(30) Foreign Application Priority Data

Jan. 23, 2025 (CN) ......................... 202510112210.8

(51) Int. Cl.
*G05D 1/639* (2024.01)
*A46B 13/00* (2006.01)
(Continued)

(52) U.S. Cl.
CPC ........... *G05D 1/639* (2024.01); *A46B 13/001* (2013.01); *A46B 13/02* (2013.01);
(Continued)

(58) Field of Classification Search
CPC ........ G05D 1/639; G05D 1/646; G05D 1/648; G05D 2105/10; G05D 2107/29;
(Continued)

(56) References Cited

U.S. PATENT DOCUMENTS 12,385,274 B1 8/2025 Zhou
2009/0301522 A1* 12/2009 Abehasera ............ E04H 4/1654 134/18

(Continued)

FOREIGN PATENT DOCUMENTS

AU 202410095 S 2/2024
CN 115234051 A 10/2022

(Continued)

*Primary Examiner* — Jelani A Smith
*Assistant Examiner* — George A Alcorn, III
(74) *Attorney, Agent, or Firm* — IPro, PLLC

(57) ABSTRACT

Disclosed are a control method for a robotic pool cleaner and a robotic pool cleaner. When the robotic pool cleaner satisfies a wall-climbing condition, it climbs a wall to travel toward a waterline. During the wall-climbing process, when the robotic pool cleaner is partially or completely located in a first wall area on a pool wall and cannot continue traveling toward the waterline, it moves in a direction opposite to a wall-climbing path to move away from the first wall area. A surface of the first wall area forms an open cavity on the pool wall, and the open cavity is capable of accommodating at least a preset proportion of the robotic pool cleaner's body. This solution can clean at least a portion of the pool wall to complete a cleaning task as much as possible while reducing energy consumption and improving cleaning efficiency.

19 Claims, 16 Drawing Sheets

(51) Int. Cl.

| | |
|---|---|
| ***A46B 13/02*** | (2006.01) |
| ***A46B 15/00*** | (2006.01) |
| ***C02F 1/00*** | (2023.01) |
| ***C02F 103/42*** | (2006.01) |
| ***E04H 4/16*** | (2006.01) |
| ***G05D 1/646*** | (2024.01) |
| ***G05D 1/648*** | (2024.01) |
| ***G05D 105/10*** | (2024.01) |
| ***G05D 107/00*** | (2024.01) |

(52) U.S. Cl.
CPC ....... *A46B 15/0004* (2013.01); *E04H 4/1654* (2013.01); *G05D 1/646* (2024.01); *G05D 1/648* (2024.01); *A46B 2200/3073* (2013.01); *C02F 1/001* (2013.01); *C02F 2103/42* (2013.01); *C02F 2201/008* (2013.01); *C02F 2209/006* (2013.01); *G05D 2105/10* (2024.01); *G05D 2107/29* (2024.01)

(58) Field of Classification Search
CPC ... A46B 13/001; A46B 13/02; A46B 15/0004; A46B 2200/3073; E04H 4/1654; C02F 1/001; C02F 2103/42; C02F 2201/008; C02F 2209/006
USPC .......................................................... 701/21
See application file for complete search history.

(56) References Cited

U.S. PATENT DOCUMENTS

| | | | | |
|---|---|---|---|---|
| 2013/0000677 | A1 | 1/2013 | Sumonthee | |
| 2017/0362845 | A1 | 12/2017 | Korenfeld | |
| 2019/0243379 | A1 * | 8/2019 | Attar | E04H 4/1654 |
| 2024/0093523 | A1 * | 3/2024 | Niewiarowski | E04H 4/1663 |
| 2024/0345604 | A1 * | 10/2024 | Herszenhaut | G05D 1/86 |
| 2025/0328147 | A1 * | 10/2025 | Cheng | A47L 11/20 |

FOREIGN PATENT DOCUMENTS

| | | | | | |
|---|---|---|---|---|---|
| CN | 218709488 | U | | 3/2023 | |
| CN | 218815528 | U | | 4/2023 | |
| CN | 116517357 | A | | 8/2023 | |
| CN | 220414991 | U | | 1/2024 | |
| CN | 308494788 | A | | 3/2024 | |
| CN | 118170143 | A | | 6/2024 | |
| CN | 118498797 | A | * | 8/2024 | E04H 4/1654 |
| CN | 118498798 | A | | 8/2024 | |
| CN | 221722426 | U | | 9/2024 | |
| CN | 119102399 | A | | 12/2024 | |
| CN | 119122340 | A | * | 12/2024 | E04H 4/1654 |
| CN | 121209387 | A | | 12/2025 | |
| CN | 223661471 | U | | 12/2025 | |
| DE | 202025100035 | U1 | | 2/2025 | |
| FR | 2925558 | A1 | | 6/2009 | |
| WO | WO-2021120998 | A1 | * | 6/2021 | G05D 1/0214 |
| WO | 2024026938 | A1 | | 2/2024 | |
| WO | WO-2024093092 | A1 | * | 5/2024 | G05D 1/0242 |

* cited by examiner

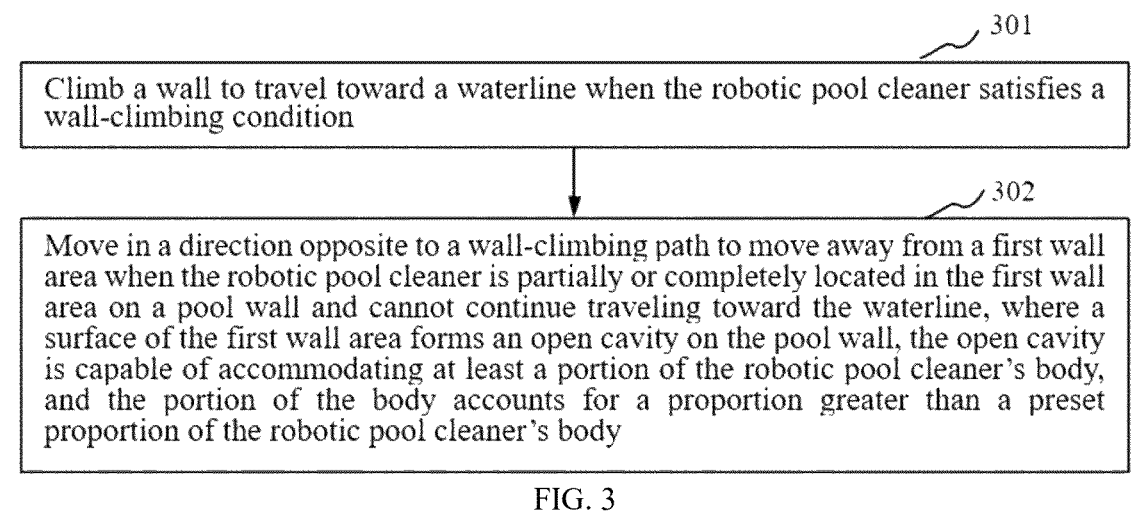

301

Climb a wall to travel toward a waterline when the robotic pool cleaner satisfies a wall-climbing condition

302

Move in a direction opposite to a wall-climbing path to move away from a first wall area when the robotic pool cleaner is partially or completely located in the first wall area on a pool wall and cannot continue traveling toward the waterline, where a surface of the first wall area forms an open cavity on the pool wall, the open cavity is capable of accommodating at least a portion of the robotic pool cleaner's body, and the portion of the body accounts for a proportion greater than a preset proportion of the robotic pool cleaner's body

FIG. 3

CONTROL METHOD FOR ROBOTIC POOL CLEANER AND ROBOTIC POOL CLEANER

CROSS-REFERENCE TO RELATED APPLICATIONS

This disclosure claims priority to Chinese Patent Application No. 202510112210.8, filed with the China National Intellectual Property Administration on Jan. 23, 2025 and entitled "CONTROL METHOD FOR ROBOTIC POOL CLEANER, ROBOTIC POOL CLEANER, AND READABLE STORAGE MEDIUM", which is incorporated herein by reference in its entirety.

TECHNICAL FIELD

Embodiments of the present application relate to the technical field of robotics and, in particular, to a control method for a robotic pool cleaner and a robotic pool cleaner.

BACKGROUND

With the development of artificial intelligence technology, various robots are increasingly entering people's lives. Robotic pool cleaners are a type of cleaning robot designed to meet pool cleaning needs, used for cleaning pool bottoms and walls, as well as filtering water in a pool.

Robotic pool cleaners often possess wall-climbing capabilities, enabling them to climb vertical pool walls and perform cleaning tasks, thereby achieving the purpose of cleaning pool walls.

However, for a curved pool wall, wall-climbing failures frequently occur, preventing robotic pool cleaners from completing pool wall cleaning tasks, and even causing them to repeatedly execute wall-climbing actions at a single location, resulting in increased energy consumption.

SUMMARY

Embodiments of the present application provide a control method for a robotic pool cleaner, a robotic pool cleaner, and a readable storage medium. When the robotic pool cleaner cannot continue moving toward a waterline on a first wall area with a relatively large curvature, it descends to leave the first wall area, thereby cleaning at least a portion of the pool wall to complete a cleaning task as much as possible, achieving the objectives of improving cleaning efficiency and reducing energy consumption.

In a first aspect, an embodiment of the present application provides a control method for a robotic pool cleaner, including:

climbing a wall to travel toward a waterline when the robotic pool cleaner satisfies a wall-climbing condition; and moving in a direction opposite to a wall-climbing path to move away from a first wall area when the robotic pool cleaner is partially or completely located in the first wall area on a pool wall and cannot continue traveling toward the waterline;

where a surface of the first wall area forms an open cavity on the pool wall, the open cavity is capable of accommodating at least a portion of the robotic pool cleaner's body, and the portion of the body accounts for a proportion greater than a preset proportion of the robotic pool cleaner's body.

In a second aspect, an embodiment of the present application provides a control device, including:

a wall-climbing module, configured to control the robotic pool cleaner to climb a wall to travel toward a waterline when the robotic pool cleaner satisfies a wall-climbing condition; and a processing module, configured to control the robotic pool cleaner to move in a direction opposite to a wall-climbing path to move away from a first wall area when the robotic pool cleaner is partially or completely located in the first wall area on a pool wall and cannot continue traveling toward the waterline;

where a surface of the first wall area forms an open cavity on the pool wall, the open cavity is capable of accommodating at least a portion of the robotic pool cleaner's body, and the portion of the body accounts for a proportion greater than a preset proportion of the robotic pool cleaner's body.

In a third aspect, an embodiment of the present application provides a robotic pool cleaner, including:

a body having a forward direction;

a first sensor group disposed at corner positions of a front end of the body, configured to detect environmental information around the robotic pool cleaner, where along a vertical direction, the first sensor group is at a first height relative to a bottom of the body;

a second sensor group disposed at corner positions of a rear end of the body, configured to detect environmental information around the robotic pool cleaner, where along the vertical direction, the second sensor group is at a second height relative to the bottom of the body, and the first height is less than the second height;

a front roller brush rotatably disposed at a front end of the bottom of the body, configured to clean a pool;

a memory configured to store a computer program; and a processor configured to execute the computer program stored in the memory to implement the method according to the first aspect or various possible implementation manners of the first aspect as described above.

In a fourth aspect, an embodiment of the present application provides a computer-readable storage medium having a computer program stored thereon, where the computer program, when executed by a processor, implements the method according to the first aspect or various possible implementation manners of the first aspect as described above.

In a fifth aspect, an embodiment of the present application provides a computer program product including a computer program, where the computer program, when executed by a processor, implements the method according to the first aspect or various possible implementation manners of the first aspect as described above.

The control method for the robotic pool cleaner, the robotic pool cleaner, and the readable storage medium provided by the embodiments of the present application operate as follows: when the robotic pool cleaner satisfies a wall-climbing condition, it climbs a wall to travel toward a waterline. During the wall-climbing process, when the robotic pool cleaner is partially or completely located in a first wall area on a pool wall and cannot continue traveling toward the waterline, it moves in a direction opposite to a wall-climbing path to move away from the first wall area. A surface of the first wall area forms an open cavity on the pool wall, the open cavity is capable of accommodating at least a portion of the robotic pool cleaner's body, and the portion of the body accounts for a proportion greater than a preset proportion of the robotic pool cleaner's body. By adopting this solution, when the first wall area that can form the open cavity accommodating the portion of the robotic pool cleaner's body exists on the pool wall, and the robotic pool cleaner cannot continue moving toward the waterline on the first wall area, the robotic pool cleaner descends to leave the first wall area, thereby cleaning at least a portion of the pool wall to complete a cleaning task as much as possible, achieving the objectives of improving cleaning efficiency and reducing energy consumption.

BRIEF DESCRIPTION OF THE DRAWINGS

To describe the technical solutions in the embodiments of the present application more clearly, the following will briefly describe the accompanying drawings required for describing the embodiments. Apparently, the accompanying drawings in the following description show merely some embodiments of the present application, and a person of ordinary skill in the art may still derive other drawings from these accompanying drawings without making creative efforts.

FIG. 3 is a flowchart of the control method for the robotic pool cleaner provided in an embodiment of the present application;

REFERENCE SIGNS USED IN THE FIGURES

100: robotic pool cleaner;
10: body;
11: traveling assemblies;
12: first sensor;
13: second sensor;
14: front roller brush;
15: rear roller brush;
16: water inlet;
17: first filter chamber;
18: second filter chamber;
19: drainage outlet;
20: water suction motor;
200: pool bottom; and
300: waterline.

DETAILED DESCRIPTION OF THE EMBODIMENTS

A swimming pool is a venue where people engage in swimming activities. During pool usage, dirt inevitably accumulates on the pool bottom and walls, and pollutants such as debris, bacteria, and foreign matter appear in the pool water, necessitating regular pool cleaning. A robotic pool cleaner is a type of cleaning robot developed to meet pool cleaning needs, capable of repeatedly cleaning the pool bottom and walls. Furthermore, the robotic pool cleaner can also filter the pool water.

When pool wall cleaning is required, the robotic pool cleaner climbs from the pool bottom onto a pool wall and performs zigzag traversal on the wall to clean it. The ability of the robotic pool cleaner to climb and perform tasks on wall surfaces is referred to as a wall-climbing function.

Typically, pool walls are perpendicular to a pool bottom and constitute smooth planar surfaces; such walls are also called planar pool walls. In addition to planar pool walls, there are non-planar pool walls, such as curved pool walls and uneven pebble-like pool walls. The curved pool walls include concave pool walls, convex pool walls, etc. When a pool wall is curved, wall-climbing failures easily occur. For example, the robotic pool cleaner may be unable to climb onto the pool wall, repeatedly attempting to climb at a single location, consequently resulting in complete failure to clean the wall, poor cleaning efficiency, and high energy consumption.

As another example, a portion or all of the robotic pool cleaner's body may climb onto the pool wall, but during the climbing process, it cannot continue ascending, causing it to repeatedly climb along the same path and become trapped, consequently leading to poor cleaning efficiency and high energy consumption.

In view of the foregoing, embodiments of the present application provide a control method for a robotic pool cleaner, a robotic pool cleaner, and a readable storage medium. When a first wall area that can form an open cavity accommodating a portion of the robotic pool cleaner's body exists on a pool wall, and the robotic pool cleaner cannot continue moving toward a waterline on the first wall area, the robotic pool cleaner descends to leave the first wall area, thereby cleaning at least a portion of the pool wall to complete a cleaning task as much as possible, achieving the objectives of improving cleaning efficiency and reducing energy consumption.

Figure 1A:
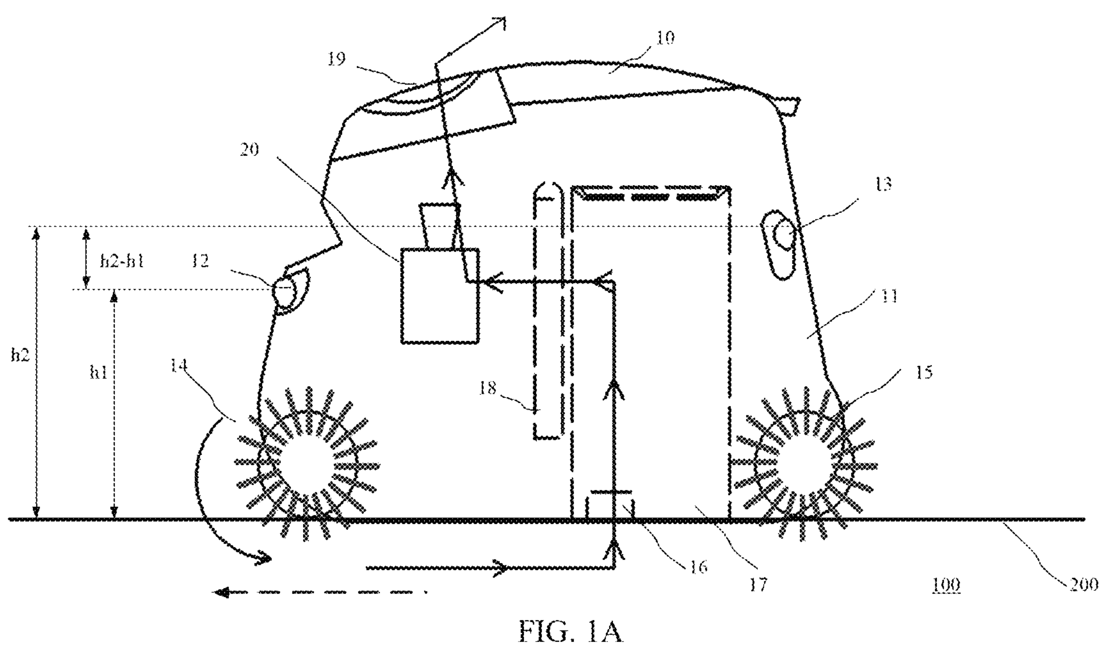
FIG. 1A is a side view of a robotic pool cleaner provided in an embodiment of the present application.
Figure 1B:
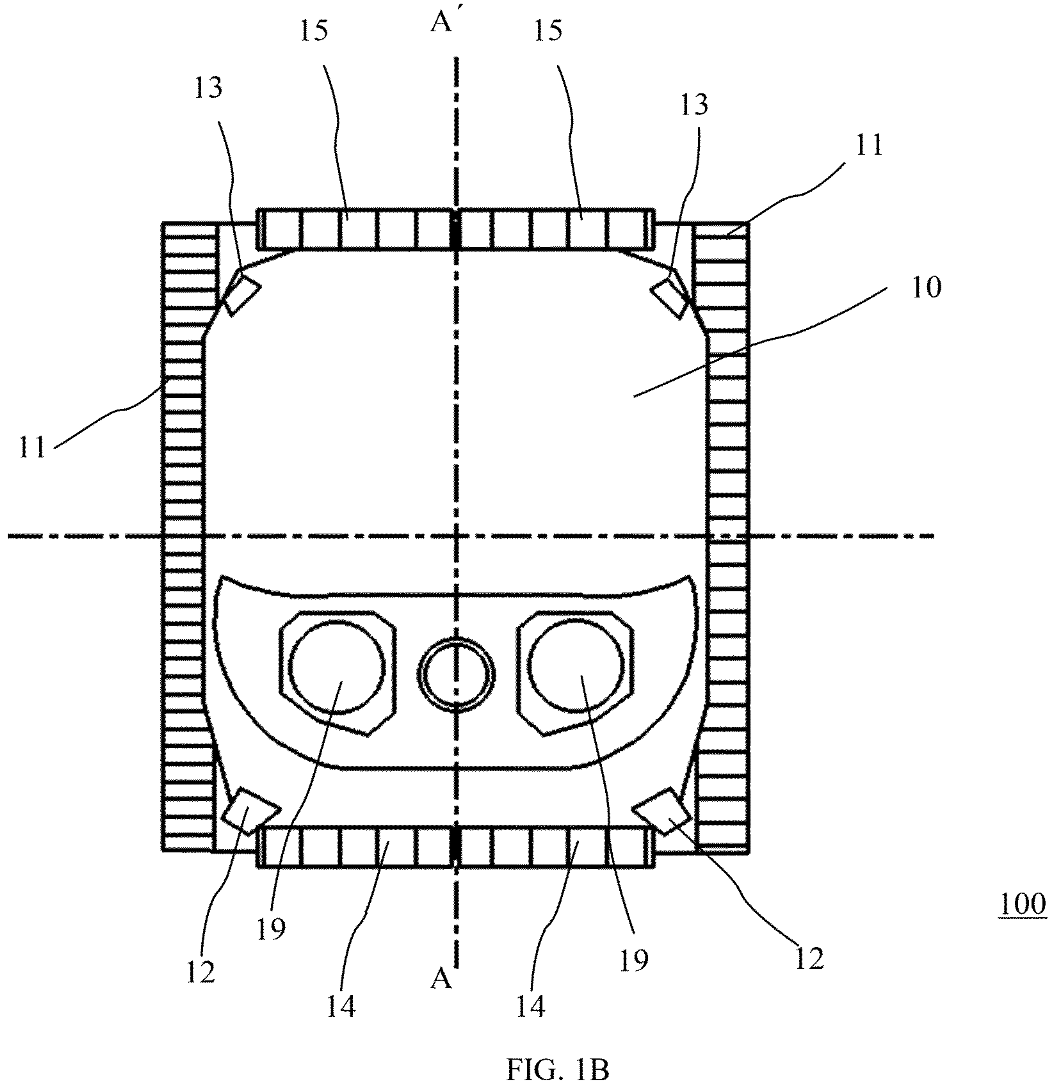
FIG. 1B is a top view of the robotic pool cleaner provided in the embodiment of the present application.

FIG. 1A is a side view of a robotic pool cleaner provided in an embodiment of the present application. FIG. 1B is a top view of the robotic pool cleaner provided in the embodiment of the present application. Referring to FIGS. 1A and 1B, the robotic pool cleaner 100 provided in this embodiment of the present application includes a body 10, where traveling assemblies 11 are arranged on both sides of the body 10, and the body 10 has a forward direction driven by the traveling assemblies 11. For example, the traveling assemblies 11 are crawler mechanisms. When the traveling assemblies 11 rotate counterclockwise, the forward direction of the robotic pool cleaner is as indicated by the dashed arrow in FIG. 1A, where the thick solid black line in FIG. 1A represents a pool bottom.

A first sensor group and a second sensor group are arranged on the body 10 of the robotic pool cleaner 100, where the first sensor group is disposed at corner positions of a front end of the body 10 and includes at least one first sensor 12; the second sensor group is disposed at corner positions of a rear end of the body 10 and includes at least one second sensor 13. In a vertical direction, i.e., a direction perpendicular to the pool bottom, the first sensor 12 is at a first height h1 relative to a bottom of the body 10, the second sensor 13 is at a second height h2 relative to the bottom of the body 10, and the first height h1 is less than the second height h2, i.e., $h2-h1>0$. Referring to FIG. 1A, the first sensors 12 are disposed at two corner positions of the front end of the robotic pool cleaner's body 10, and the second sensors 13 are disposed at two corner positions of the rear end of the robotic pool cleaner's body 10. The first sensors 12 are closer to a bottom of the robotic pool cleaner 100. Compared to the second sensors 13, the first sensors 12 are capable of detecting low obstacles, while the second sensors 13 located at the corner positions of the rear end of the body 10 are capable of detecting higher obstacles. Therefore, this configuration, to some extent, expands the detection range of the sensors, ensuring the safety of the robotic pool cleaner. This embodiment of the present application does not limit the number of the first sensors 12 and the second sensors 13; for example, the number of the first sensors 12 and the number of the second sensors 13 may be greater than 1.

Optionally, the first sensor group includes at least one of an acoustic sensor, a time-of-flight (TOF) sensor, a laser sensor, an ultrasonic phased array sensor, and a vision sensor; the second sensor group includes at least one of the acoustic sensor, the time-of-flight (TOF) sensor, the laser sensor, the ultrasonic phased array sensor, and the vision sensor. In addition to the first sensor group and the second sensor group, sensors may also be arranged at other positions of the robotic pool cleaner, which is not limited in this embodiment of the present application. For example, a downward vision sensor may be arranged at the bottom of the robotic pool cleaner.

By way of example, the first sensor 12 and the second sensor 13 may be, for instance, acoustic sensors, TOF sensors, laser sensors, or vision sensors, etc., which is not limited in this embodiment of the present application. The vision sensors include, but are not limited to, camera plus line laser sensors, line laser 3D cameras, etc.

When the number of the first sensors 12 included in the first sensor group is ≥2, the first sensors 12 may be of the same type or different types of sensors; for example, all may be TOF sensors, or one of the first sensors 12 may be a TOF sensor and another one of the first sensors 12 may be a vision sensor.

Similarly, when the number of the second sensors 13 included in the second sensor group is ≥2, the second sensors 13 may be of the same type or different types of sensors.

By adopting this solution, the types of sensors in the first sensor group and the second sensor group can be selected as required, providing a high degree of flexibility.

Referring to FIGS. 1A and 1B, a front roller brush 14 is arranged at the front end of the body 10 of the robotic pool cleaner 100, and a rear roller brush 15 is arranged at the rear end thereof. When the robotic pool cleaner 100 travels forward, the front roller brush 14 and the rear roller brush 15 rotate counterclockwise, in the same rotation direction as the traveling assemblies 11. By continuously rotating the front roller brush 14 and the rear roller brush 15, they constantly contact the pool bottom or pool wall and scrub the pool wall or pool bottom, thereby achieving the cleaning purpose. Moreover, since the rotation direction of the front roller brush 14 and the rear roller brush 15 is the same as that of the traveling assemblies 11, the forward resistance of the robotic pool cleaner 100 is reduced to some extent, achieving the objective of improving cleaning efficiency.

When the robotic pool cleaner 100 moves backward, the traveling assemblies 11 rotate clockwise, while the front roller brush 14 and the rear roller brush 15 maintain counterclockwise rotation; alternatively, the front roller brush 14 and the rear roller brush 15 may switch to clockwise rotation. When the front roller brush 14 and the rear roller brush 15 rotate counterclockwise, their rotation direction is opposite to that of the traveling assemblies 11, resulting in greater cleaning intensity and increased cleaning frequency for the same area, thereby improving cleaning quality to some extent. When the front roller brush 14 and the rear roller brush 15 rotate clockwise, their rotation direction is the same as that of the traveling assemblies 11, reducing the resistance during backward movement of the robotic pool cleaner 100 and thereby improving cleaning efficiency to some extent.

This embodiment of the present application does not limit the size and number of the front roller brush 14 and the rear roller brush 15. For example, one front roller brush 14 and one rear roller brush 15 may be arranged, with the length of the front roller brush 14 and the length of the rear roller brush 15 being close to the width of the robotic pool cleaner 100.

As another example, two front roller brushes 14 and two rear roller brushes 15 may be arranged. Referring to FIG. 1B, the dash-dot line represents the central axis of the robotic pool cleaner. Two front roller brushes 14 and two rear roller brushes 15 are symmetrically arranged on both sides of the central axis in the vertical direction, respectively. Since a gap exists between the two front roller brushes 14, water flow can pass through the gap in a direction opposite to the traveling direction, thereby reducing traveling resistance.

In this embodiment of the present application, the robotic pool cleaner 100 is further provided with a memory, a processor, and other components, which are not illustrated in the figures.

Optionally, in addition to its cleaning capability, the robotic pool cleaner 100 also possesses filtering capability. Based on this filtering capability, the robotic pool cleaner can collect debris from the swimming pool. Referring to FIG. 1A, a water inlet 16 is arranged at the bottom of the body 10, and a first filter chamber 17 and/or a second filter chamber 18 are arranged inside the body 10. The filter screen of the first filter chamber 17 has larger mesh openings and is used for filtering larger debris in the pool water, such as leaves; the filter screen of the second filter chamber has fine and dense mesh openings and is used for filtering smaller debris in the pool water, such as hair. During forward traveling, as shown by the continuous arrows in FIG. 1A: the pool water enters the first filter chamber 17 through the water inlet 16 for coarse filtration, where larger debris is retained in the first filter chamber through coarse filtration, and smaller debris enters the second filter chamber with the water flow for fine filtration, where smaller debris is retained in the second filter chamber through fine filtration. The filtered pool water is discharged from a drainage outlet 19, with the drainage direction being diagonally rearward, as indicated by the arrow direction in FIG. 1B.

In this embodiment of the present application, the pool wall is a curved surface, such as a concave pool wall or a convex pool wall. Taking a concave pool wall as an example, the pool wall includes a first wall area, where the surface of the first wall area forms a preset wall-climbing path. As an example, when the surface of the first wall area is concave, the surface of the first wall area forms a concave preset wall-climbing path, and the difference between the curvature of the first wall area and a preset curvature is greater than a preset value. For example, a rectangular swimming pool has 4 pool walls, one of which is entirely concave, meaning the first wall area is the entire pool wall; as another example, one area on a pool wall is concave, meaning the first wall area is a partial area of the pool wall, where the curvature of the first wall area is the average curvature of all points on the first wall surface. The preset curvature is, for example, the curvature of a vertical wall surface, which is the average curvature of all points on the vertical wall surface.

Below, taking the case where the first wall area is a partial area of the pool wall as an example, the scenarios to which this embodiment of the present application applies will be described in detail. Exemplarily, reference may be made to FIG. 2.

Figure 2A:
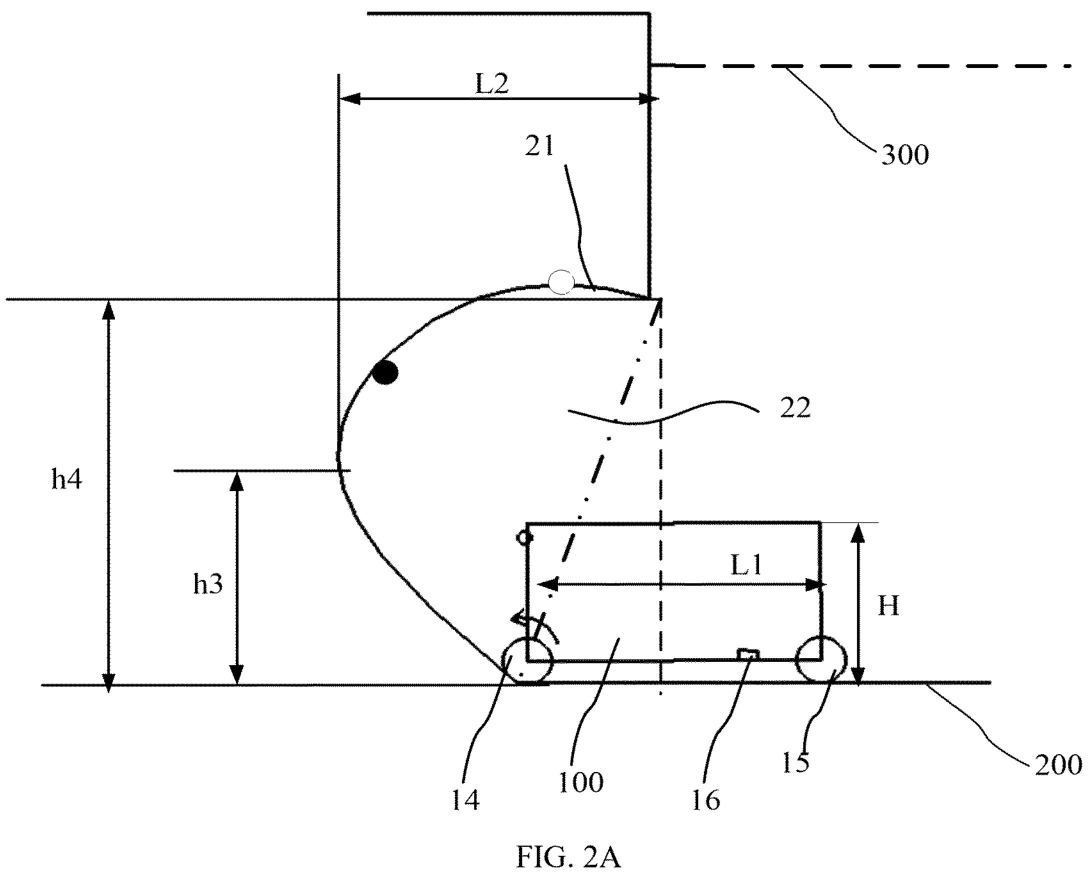
FIG. 2A is a schematic diagram of a scenario of a control method for a robotic pool cleaner provided in an embodiment of the present application.

FIG. 2A is a schematic diagram of a scenario of a control method for a robotic pool cleaner provided in an embodiment of the present application. Referring to FIG. 2A, the robotic pool cleaner 100 has a height H and a length L1. A portion of the pool wall is concave, meaning the pool wall includes a first wall area 21. This first wall area 21 is a concave area, where the surface of the pool wall in the concave area forms a preset wall-climbing path, and the surface of the first wall area 21 (i.e., the preset wall-climbing path) forms an open cavity 22, with no other area existing between the open cavity 22 and the pool bottom. In FIG. 2A, the opening of the open cavity 22 is indicated by the dash-double-dot line, with one end of the dash-double-dot line located at the pool bottom and the other end at the pool wall. The vertical aperture of the open cavity 22 is indicated by the dashed line in the figure. The horizontal aperture of the open cavity 22 has a length of L2, and the vertical aperture has a height of h4. The depth of the deepest point of the open cavity 22 is h3. The ratio of the length L2 of the horizontal aperture to the length L1 of the robotic pool cleaner 100 is greater than or equal to a preset ratio, i.e., $L2/L1 \geq$ the preset ratio. The ratio of the depth h3 of the deepest point of the open cavity 22 to the height h4 of the vertical aperture is greater than or equal to a preset ratio, i.e., $h3/h4 \geq$ the preset ratio. Furthermore, the depth h3 of the deepest point of the open cavity 22 is greater than the height H of the robotic pool cleaner 100, i.e., $h3 > H$. The preset ratio may be, for example, one-third, one-quarter, etc., which is not limited in this embodiment of the present application. The robotic pool cleaner 100 is provided with a sensor such as at least one or more of an acoustic sensor, a time-of-flight (TOF) sensor, a laser sensor, an ultrasonic phased array sensor, a vision sensor, and a gyroscope. Based on the sensor, the robotic pool cleaner can be controlled to climb a wall along the preset wall-climbing path and measure at least one of the depth h3 of the deepest point of the open cavity 22 and the length h4 of the vertical aperture of the open cavity 22.

For example, the sensor includes a first sensor group and a second sensor group and includes at least an ultrasonic phased array sensor. The robotic pool cleaner 100 uses data collected by the ultrasonic phased array sensor to model the open cavity, thereby obtaining at least one of the depth h3 of the deepest point of the open cavity 22 and the length h4 of the vertical aperture. Subsequently, the robotic pool cleaner 100, combined with data calibrated by the sensor, determines whether the open cavity 22 can accommodate at least a portion of the robotic pool cleaner's body, with the portion of the body accounting for a proportion greater than a preset proportion of the robotic pool cleaner's body.

In this embodiment of the present application, the pool wall has at least one first wall area, or the entire pool wall constitutes a first wall area. Since the surface of the first wall area forms an open cavity, it is equivalent to the pool wall having a concave area. The open cavity can accommodate at least a portion of the robotic pool cleaner's body, for example, at least one-third of the robotic pool cleaner's body. Thus, it can be seen that in this embodiment of the present application, the pool wall is one with concave areas, for instance, a pool wall with an inwardly concave hemispherical area; or, a pool wall with irregular concave areas.

It should be noted that although FIG. 2A illustrates the scenario where no other area exists between the open cavity 22 and the pool bottom, this embodiment of the present application is not limited thereto. Exemplarily, reference may be made to FIG. 2B.

Figure 2B:
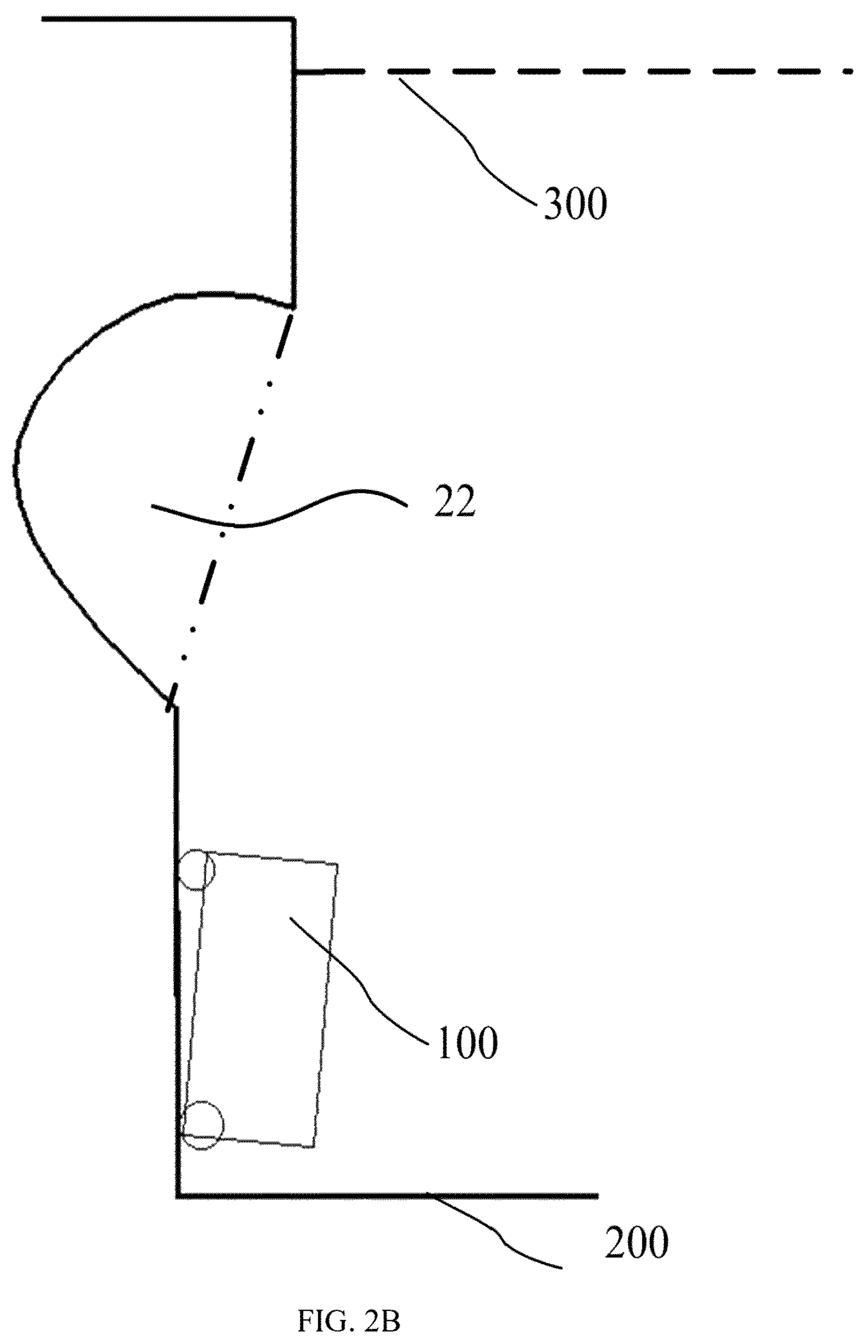
FIG. 2B is a schematic diagram of another scenario of the control method for the robotic pool cleaner provided in an embodiment of the present application.

FIG. 2B is a schematic diagram of another scenario of the control method for the robotic pool cleaner provided in an embodiment of the present application. Referring to FIG. 2B, a vertical area exists between the first wall area and the pool bottom. The robotic pool cleaner begins climbing the wall from the pool bottom, first ascending to the surface of the pool wall. Then, it continues climbing from the vertical area toward the first wall area. In this scenario, the robotic pool cleaner moves in the direction opposite to the wall-climbing path until it leaves the first wall area. After leaving the first wall area, the robotic pool cleaner is located in the vertical area. Subsequently, the robotic pool cleaner continues descending the wall to leave the vertical area and attempts wall climbing again at a different location. Alternatively, after leaving the first wall area and being located in the vertical area, the robotic pool cleaner may attempt to climb the first wall area again.

It should be noted that although FIG. 2B illustrates the scenario where a vertical area exists between the first wall area and the pool bottom, this embodiment of the present application is not limited thereto. In other feasible implementation manners, a small-curvature area may also exist between the first wall area and the pool bottom. The vertical area has the smallest curvature and can be regarded as a special type of small-curvature area.

By adopting this solution, whether a small-curvature area exists between the first wall area and the pool bottom, or no other area exists therebetween, the robotic pool cleaner will not repeatedly climb the wall at the same location in either case. Instead, it returns along the wall-climbing path, demonstrating strong adaptability and achieving the objective of improving cleaning effectiveness.

Figure 2C:
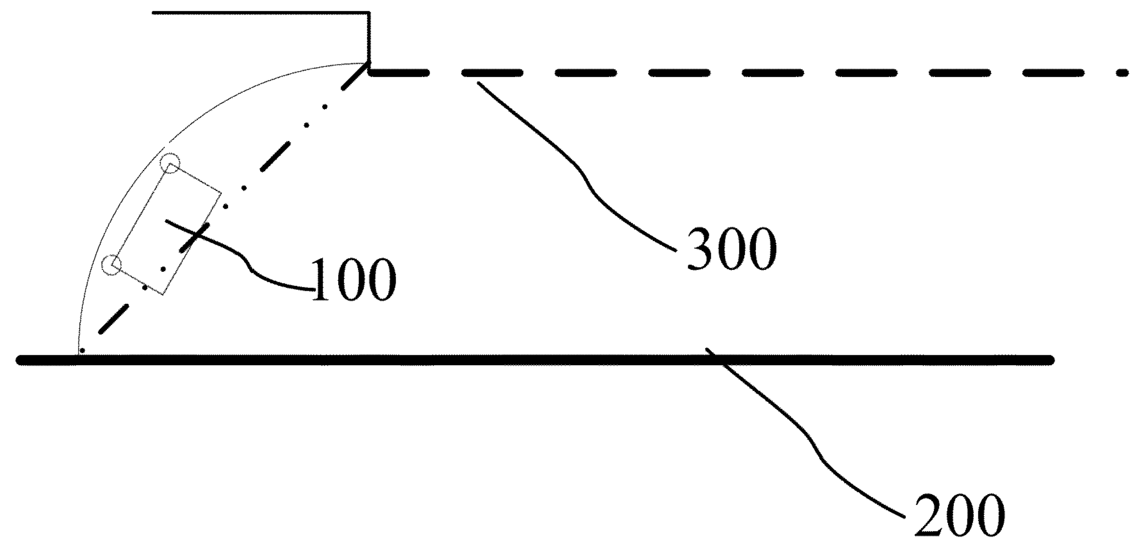
FIG. 2C is a schematic diagram of yet another scenario of the control method for the robotic pool cleaner provided in an embodiment of the present application.

FIG. 2C is a schematic diagram of yet another scenario of the control method for the robotic pool cleaner provided in an embodiment of the present application. The difference from FIG. 2A is that in FIG. 2C, the curvature of the first wall area increases at positions closer to the waterline, whereas in FIG. 2B, the curvature of the first wall area is constant.

In FIGS. 2A to 2C, the opening of the open cavity 22 is as indicated by the dash-double-dot lines in the figures, and the open cavity 22 can accommodate at least one-third of the robotic pool cleaner's body. If the open cavity is too small or no open cavity is formed, the robotic pool cleaner will not experience wall-climbing failure. Exemplarily, reference may be made to FIGS. 2D and 2E.

Figure 2D:
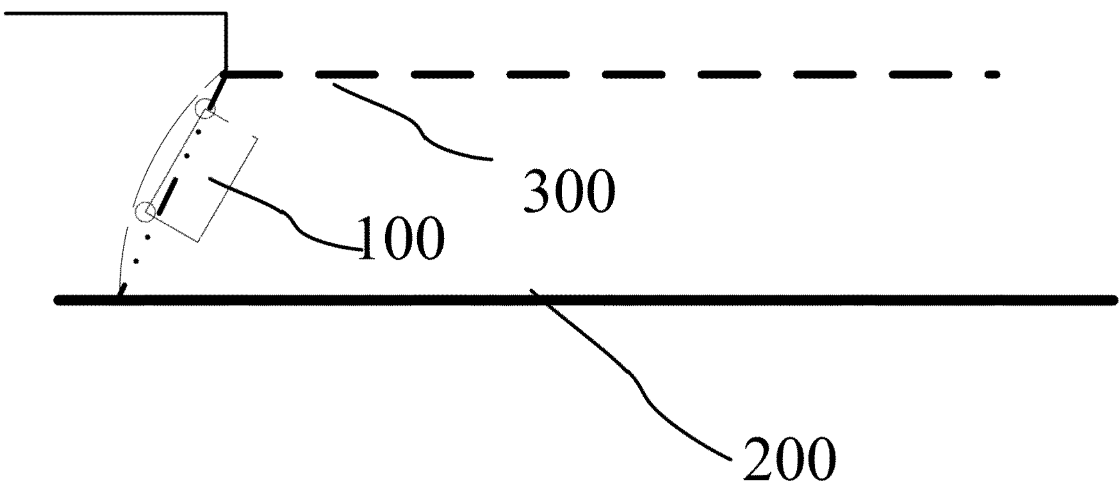
FIG. 2D is a schematic diagram of an open cavity being too small.

FIG. 2D is a schematic diagram of an open cavity being too small. Referring to FIG. 2D, the pool wall is slightly concave, but the open cavity formed by the concave portion is very small and cannot accommodate at least one-third of the robotic pool cleaner's body. Therefore, the robotic pool cleaner successfully climbs the wall, i.e., it can travel to the waterline.

Figure 2E:
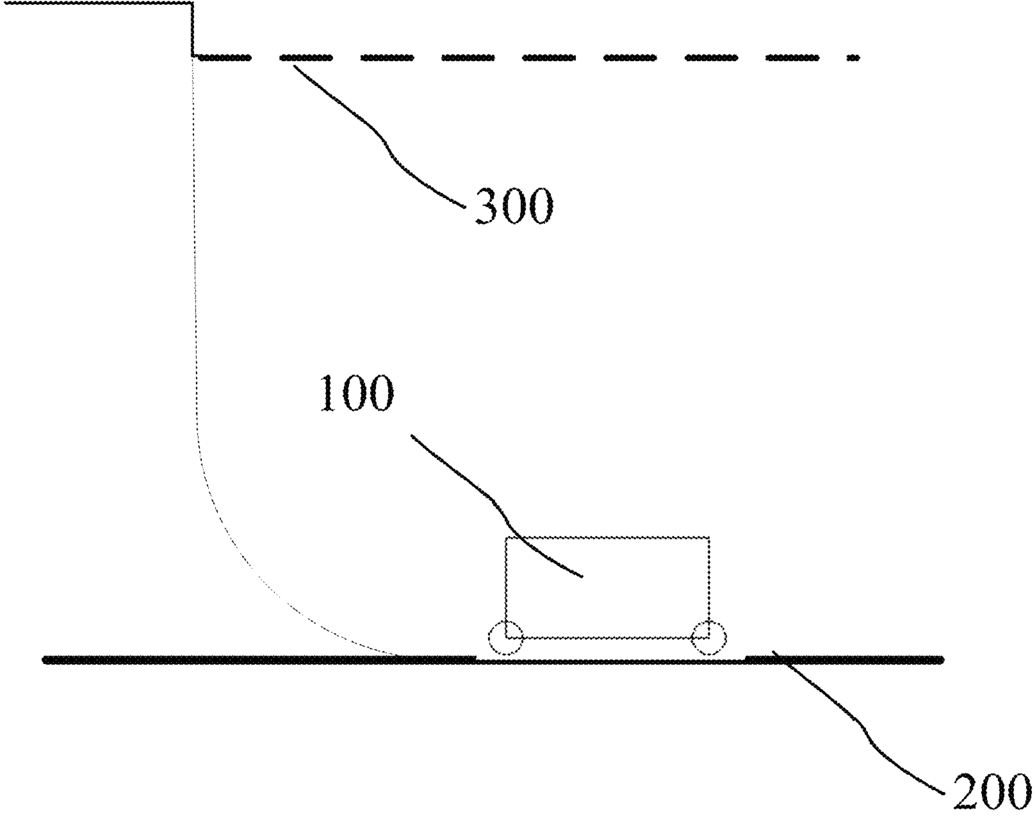
FIG. 2E is a schematic diagram of a pool wall without an open cavity formed.

FIG. 2E is a schematic diagram of a pool wall without an open cavity formed. Referring to FIG. 2E, although the pool wall is curved, the curved surface does not form an open cavity. Therefore, the robotic pool cleaner successfully climbs the wall, i.e., it can travel to the waterline.

In combination with FIGS. 2A to 2E above, it can be seen that in the scenarios of FIGS. 2D and 2E, the robotic pool cleaner can successfully climb the wall, and the solutions described in the embodiments of the present application need not be considered.

It can be understood that if the pool wall is an uneven, pebble-like wall, the open cavities formed by the concave areas cannot accommodate a portion of the robotic pool cleaner's body, i.e., the concave areas are very small, making the surface of the pool wall unsmooth. In such cases, the situation where part or all of the robotic pool cleaner's body is located in an open cavity on the pool wall and cannot continue traveling toward the waterline will not occur.

Optionally, in the aforementioned embodiments, the outer diameter D of the front roller brush 14 of the robotic pool cleaner 100 is less than or equal to the length L2 of the horizontal aperture of the open cavity 22, i.e., D≤L2. In this way, the front roller brush 14 can be fully accommodated within the open cavity 22, thereby enabling cleaning of dead zones on the pool wall and pool bottom. Dead zones refer to locations that are difficult to reach and clean. In other examples, by controlling the robotic pool cleaner 100 through the technical solution described in the present application, the front roller brush 14 can be caused to effectively clean dead zones on the pool wall and pool bottom, thereby improving the cleaning coverage of the robotic pool cleaner 100.

By adopting this solution, the roller brushes on the robotic pool cleaner have a smaller outer diameter, facilitating the cleaning of dead zones in the pool and achieving the objective of improving cleaning quality.

When the robotic pool cleaner is climbing the first wall area toward the waterline 300, wall-climbing failures are prone to occur. For example, a portion of the body 10 of the robotic pool cleaner 100 may climb onto the first wall area while the remainder of the body remains on the pool bottom, but it cannot ascend further and is unable to continue traveling toward the waterline 300. As another example, the robotic pool cleaner 100 may climb onto the first wall area, i.e., the entire body 10 is located on the first wall area, but it cannot ascend further. Reasons for the inability to ascend include, but are not limited to: the first wall area pressing against the robotic pool cleaner 100, insufficient friction between the first wall area and the traveling assemblies, etc.

When the robotic pool cleaner 100 cannot continue traveling toward the waterline 300, it moves in the direction opposite to the wall-climbing path to leave the preset wall-climbing path formed by the surface of the first wall area, thereby preventing the robotic pool cleaner 100 from repeatedly climbing the same path and becoming trapped.

Below, based on the description of the aforementioned robotic pool cleaner and related scenarios, the control method for the robotic pool cleaner according to embodiments of the present application will be described in detail. Exemplarily, reference may be made to FIG. 3.

FIG. 3 is a flowchart of the control method for the robotic pool cleaner provided in an embodiment of the present application. This embodiment is applied to the robotic pool cleaner and includes:

301: climbing a wall to travel toward a waterline when the robotic pool cleaner satisfies a wall-climbing condition.

Exemplarily, the wall-climbing condition is that a distance between the robotic pool cleaner located on a pool bottom and a pool wall is less than or equal to a preset distance, and the robotic pool cleaner is perpendicular to the pool wall. Referring to FIG. 1B, the robotic pool cleaner being approximately perpendicular to the pool wall means that the central axis AA' of the robotic pool cleaner in the vertical direction is perpendicular to the pool wall. When the robotic pool cleaner is located on the pool bottom, the central axis AA' in the vertical direction is parallel to the pool bottom. The preset distance may be, for example, 30 cm, 40 cm, 15 cm, etc., which is not limited in this embodiment of the present application. Wall climbing refers to the robotic pool cleaner climbing onto the pool wall and continuing traveling toward the waterline along the pool wall.

When the robotic pool cleaner satisfies the wall-climbing condition, the to-be-climbed pool wall may be a planar surface or a curved surface. When the pool wall is planar, the plane of the pool wall is approximately perpendicular to the pool bottom, with an angle of approximately 90° therebetween. When the robotic pool cleaner is directly facing the preset wall-climbing path formed by the surface of the first wall area of the pool wall, then the to-be-climbed pool wall is a curved surface.

302: moving in a direction opposite to a wall-climbing path to move away from a first wall area when the robotic pool cleaner is partially or completely located in the first wall area on a pool wall and cannot continue traveling toward the waterline, where a surface of the first wall area forms an open cavity on the pool wall, the open cavity is capable of accommodating at least a portion of the robotic pool cleaner's body, and the portion of the body accounts for a proportion greater than a preset proportion of the robotic pool cleaner's body.

Also referring to FIG. 2A, during the process of the robotic pool cleaner climbing the wall to travel toward the waterline 300, the robotic pool cleaner gradually ascends the wall. As it continues climbing, the robotic pool cleaner becomes partially or completely located in the first wall area on the pool wall. That is, before climbing the wall, the entire body of the robotic pool cleaner is located on the pool bottom. After climbing the wall, a portion of the robotic pool cleaner's body is located within the open cavity formed by the surface of the first wall area. If the robotic pool cleaner could continue traveling toward the waterline, the entire body of the robotic pool cleaner would be located within the open cavity.

When a portion of the robotic pool cleaner's body is located in the first wall area and the robotic pool cleaner cannot continue climbing the wall to travel toward the waterline, the robotic pool cleaner moves in the direction opposite to the wall-climbing path to move away from the first wall area. Similarly, when the robotic pool cleaner is completely located in the first wall area and cannot continue climbing the wall to travel toward the waterline, it moves in the direction opposite to the wall-climbing path to move away from the first wall area.

In this embodiment of the present application, when the robotic pool cleaner moves in the direction opposite to the wall-climbing path, in one approach, after being unable to continue traveling toward the waterline, the robotic pool cleaner reverses along the wall-climbing path; in another approach, after being unable to continue traveling toward the waterline, the robotic pool cleaner first turns around and then moves forward in the direction opposite to the wall-climbing path. Whether reversing or moving forward, both are along the direction opposite to the wall-climbing path, i.e., descending the wall along the climbing path.

In this embodiment of the present application, during the process from starting to climb the wall to being unable to continue climbing toward the waterline, the robotic pool cleaner cleans a portion of the pool wall. Subsequently, during the process of traveling in the direction opposite to the wall-climbing path, the front roller brush moves downward along the first wall area in the vertical direction. Gradually, the front roller brush completely disengages from the first wall area, i.e., it no longer contacts the first wall surface. Obviously, during the process of traveling in the opposite direction, the robotic pool cleaner cleans at least a portion of the first wall area, and also cleans the junction between the first wall area and the pool bottom.

The control method for the robotic pool cleaner provided in this embodiment of the present application operates as follows: when the robotic pool cleaner satisfies a wall-climbing condition, it climbs a wall to travel toward a waterline. During the wall-climbing process, when the robotic pool cleaner is partially or completely located in a first wall area on a pool wall and cannot continue traveling toward the waterline, it moves in a direction opposite to a wall-climbing path to move away from the first wall area. A surface of the first wall area forms an open cavity on the pool wall, the open cavity is capable of accommodating at least a portion of the robotic pool cleaner's body, and the portion of the body accounts for a proportion greater than a preset proportion of the robotic pool cleaner's body. By adopting this solution, when the first wall area that can form the open cavity accommodating the portion of the robotic pool cleaner's body exists on the pool wall, and the robotic pool cleaner cannot continue moving toward the waterline on the first wall area, the robotic pool cleaner descends to leave the first wall area, thereby cleaning at least a portion of the pool wall to complete a cleaning task as much as possible, achieving the objectives of improving cleaning efficiency and reducing energy consumption.

Below, the scenarios where the robotic pool cleaner is completely located in the first wall area and cannot continue traveling toward the waterline, and where the robotic pool cleaner is partially located in the first wall area and cannot continue traveling toward the waterline, will be described in detail respectively.

First, the scenario where the robotic pool cleaner is completely located in the first wall area and cannot continue traveling toward the waterline will be described.

Figure 4:
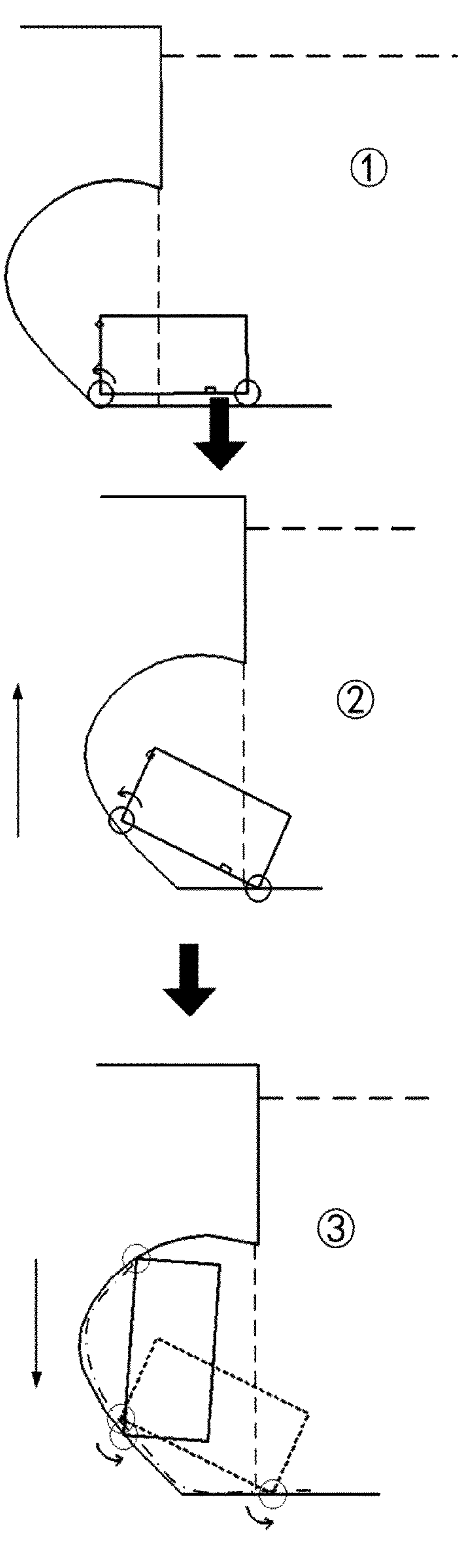
FIG. 4 is a schematic process diagram of the control method for the robotic pool cleaner provided in an embodiment of the present application.

FIG. 4 is a schematic process diagram of the control method for the robotic pool cleaner provided in an embodiment of the present application. Referring to Sub-FIG. 1) of FIG. 4, initially, the robotic pool cleaner satisfies the wall-climbing condition and begins climbing the wall, with the front roller brush rotating counterclockwise as indicated by the curved arrow in the figure. After a period of time, most of the robotic pool cleaner's body is located in the first wall area, as shown in Sub-FIG. 2). Subsequently, the robotic pool cleaner continues climbing the wall, causing the entire robotic pool cleaner to be located within the containment cavity, as shown by the solid-line depiction of the robotic pool cleaner in Sub-FIG. 3) of FIG. 4. Next, the robotic pool cleaner cannot continue traveling toward the waterline. For example, the robotic pool cleaner is provided with a displacement sensor, through which it is found that the cumulative displacement has not changed within a preset duration, thus the robotic pool cleaner determines that it cannot continue traveling toward the waterline.

When the robotic pool cleaner detects that it cannot continue traveling toward the waterline, it moves in the direction opposite to the wall-climbing path to move away from the first wall area. The dash-dot line in Sub-FIG. 3) of FIG. 4 represents the wall-climbing path. The robotic pool cleaner reverses along the direction opposite to the wall-climbing path, with the rotation directions of the front and rear roller brushes as indicated by the curved arrows in the figure. After a period of time, a portion of the robotic pool cleaner's body exits the containment cavity, as shown by the dashed-line depiction of the robotic pool cleaner in Sub-FIG. 3) of FIG. 4. The robotic pool cleaner continues reversing until its entire body has exited the open cavity.

During the process of the robotic pool cleaner ascending the wall along the wall-climbing path and descending in the opposite direction, the front and/or rear roller brushes continuously rotate to clean the pool bottom and pool wall. Obviously, as shown in the last sub-figure of FIG. 4: the robotic pool cleaner cleans each position on the wall-climbing path indicated by the dash-dot line at least twice.

Second, the scenario where the robotic pool cleaner is partially located in the first wall area and cannot continue traveling toward the waterline will be described.

Figure 5:
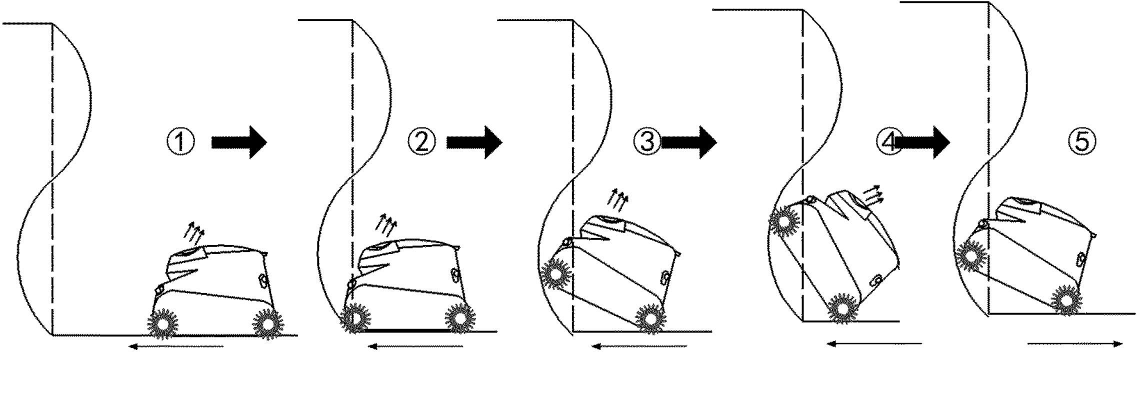
FIG. 5 is another schematic process diagram of the control method for the robotic pool cleaner provided in an embodiment of the present application.

FIG. 5 is another schematic process diagram of the control method for the robotic pool cleaner provided in an embodiment of the present application. Referring to FIG. 5, the surface of the pool wall exhibits an "S" shape, with the first wall area being the concave portion of the "S"-shaped pool wall. The open cavity formed by this concave portion can accommodate at least a portion of the robotic pool cleaner's body, such as one-third of the robotic pool cleaner's body. Initially, the robotic pool cleaner is relatively far from the pool wall, as shown in Sub-FIG. 1). The robotic pool cleaner travels toward the pool wall until it satisfies the wall-climbing condition, as shown in Sub-FIG. 2). Subsequently, the robotic pool cleaner climbs the wall to travel toward the waterline. After a period of time, a portion of the robotic pool cleaner's body is located within the open cavity, as shown in Sub-FIG. 3). The robotic pool cleaner continues climbing the wall, but encounters a situation where it cannot continue traveling toward the waterline, as shown in Sub-FIG. 4).

When the robotic pool cleaner detects that it cannot continue traveling toward the waterline, it moves in the direction opposite to the wall-climbing path, as shown in Sub-FIG. 5). Subsequently, the robotic pool cleaner continues reversing along the direction opposite to the wall-climbing path until it completely exits the open cavity.

In this embodiment of the present application, referring to FIG. 1A, the robotic pool cleaner is also provided with a water suction motor 20, configured to draw pool water into the first filter chamber through the water inlet, perform coarse filtration on the pool water through the first filter chamber, and perform fine filtration on the coarsely filtered pool water through the second filter chamber. When the water suction motor 20 is activated, the filtered pool water is discharged from the drainage outlet 19, and the discharge direction may be diagonally rearward, as indicated by the slanted arrow in FIG. 5. Obviously, due to water suction required for filtration, a negative pressure is formed between the bottom of the robotic pool cleaner and the pool wall or pool bottom, causing the robotic pool cleaner to adhere to the pool wall or pool bottom under the effect of this negative pressure. When the robotic pool cleaner is traveling toward the waterline, the existence of the negative pressure helps prevent the robotic pool cleaner from falling off the pool wall. However, when the robotic pool cleaner is partially or completely located in the first wall area on the pool wall and cannot continue traveling toward the waterline, if the water suction motor 20 still keeps at a high power, such as remaining activated, it hinders the robotic pool cleaner from moving in the direction opposite to the wall-climbing path, i.e., it hinders the robotic pool cleaner from moving away from the first wall area. Therefore, before the robotic pool cleaner moves in the direction opposite to the wall-climbing path to move away from the first wall area, at least one water suction motor 20 can be deactivated to reduce the power of the water suction motor 20. At this time, the water volume discharged from the drainage outlet 19. In this way, the negative pressure between the bottom of the robotic pool cleaner (for example, at the water inlet 16) and the pool wall is reduced, thereby not hindering the robotic pool cleaner from moving away from the first wall area, as shown in Sub-FIG. 5) of FIG. 5.

By adopting this solution, since the power of at least one water suction motor is reduced, the negative pressure generated by filtration and drainage is prevented from hindering the robotic pool cleaner from moving away from the first wall area, thereby reducing resistance during the process of the robotic pool cleaner moving away from the first wall area, and achieving the objective of improving cleaning efficiency.

Optionally, in the aforementioned embodiments, after the robotic pool cleaner leaves the first wall area, it moves from a first position to a second position, and climbs the wall from the second position to travel toward the waterline, where the first position is a location where the robotic pool cleaner is located after leaving the first wall area, and the distance between the first position and the second position is greater than a preset distance.

Figure 6:
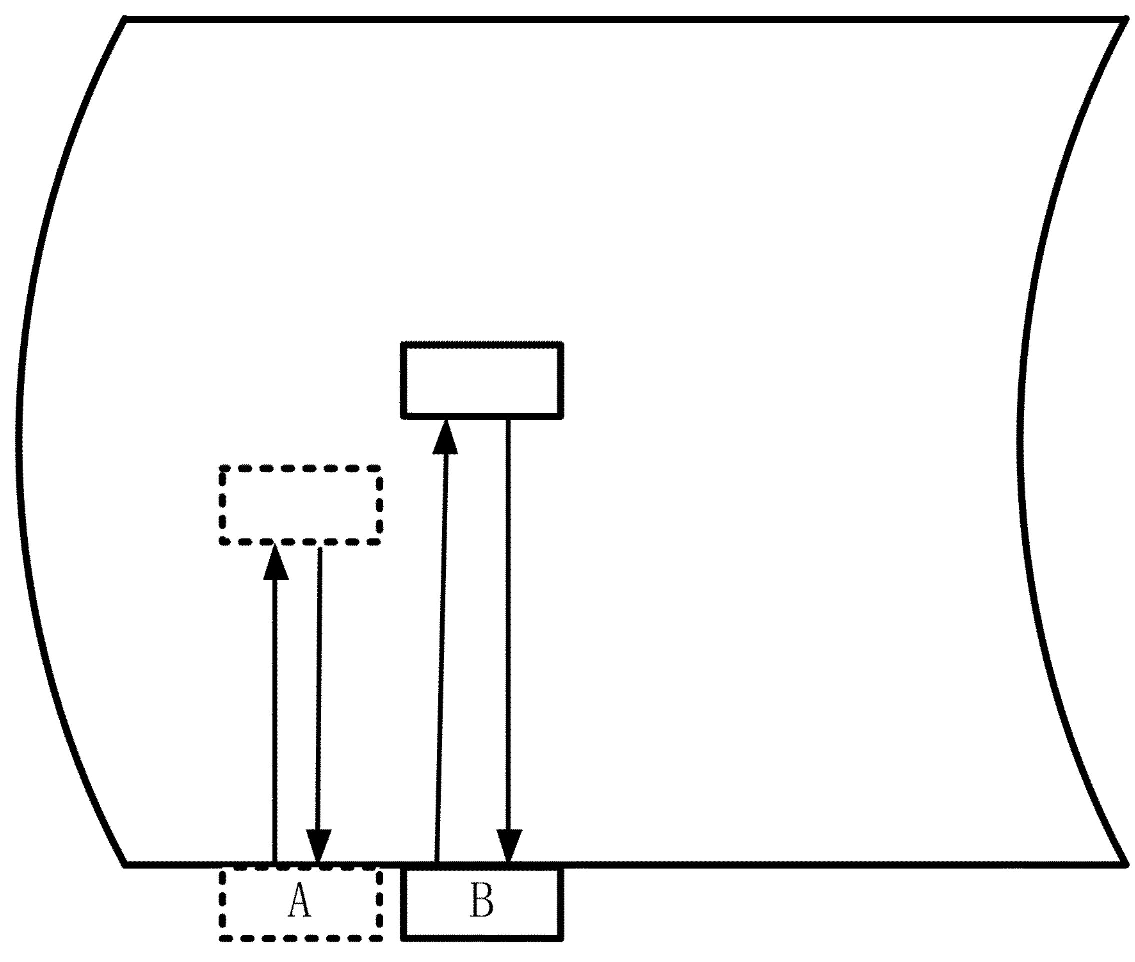
FIG. 6 is yet another schematic process diagram of the control method for the robotic pool cleaner provided in an embodiment of the present application.

FIG. 6 is yet another schematic process diagram of the control method for the robotic pool cleaner provided in an embodiment of the present application. Referring to FIG. 6, the pool wall has a concave first wall area; other pool walls are not illustrated in the figure, only the first wall area is shown. Position A is the first position, and Position B is the second position. The robotic pool cleaner begins climbing the wall from the first position. When the robotic pool cleaner is partially or completely located in the first wall area and cannot continue traveling toward the waterline, it moves in the direction opposite to the wall-climbing path to move away from the first wall area. After leaving the first wall area, the robotic pool cleaner reaches the first position, moves from the first position to the second position, and begins climbing the wall from the second position. The distance between the first position and the second position is greater than a preset distance. The preset distance may be, for example, 10 cm, 5 cm, 20 cm, etc., which is not limited in this embodiment of the present application.

Referring to FIG. 6, Position A is the first position, and Position B is the second position; the first position and the second position are offset. That is, when the robotic pool cleaner's body is partially or completely located in the first wall area and cannot continue ascending, after moving in the direction opposite to the wall-climbing path to leave the first wall area, it climbs the wall again from a different location, i.e., it begins climbing the wall from the second position.

It should be noted that in FIG. 6, climbing the wall from either the first position or the second position involves climbing the pool wall, such as climbing the first wall area. However, this embodiment of the present application is not limited thereto; for example, climbing the wall from the second position may involve ascending a vertical pool wall, i.e., a wall with a small curvature.

Additionally, it should be noted that in FIG. 6, for clarity, the movement trajectory of wall climbing and the movement trajectory of wall descending are shown offset; in reality, the two trajectories coincide, meaning descending the wall involves moving in the direction opposite to the wall-climbing path.

By adopting this solution, during the wall-climbing process, if the robotic pool cleaner cannot continue traveling toward the waterline and moves in the direction opposite to the wall-climbing path to move away from the first wall area, it continues climbing the wall from a different position, thereby covering as much of the pool wall and the junction between the pool wall and pool bottom as possible, achieving the objective of improving cleaning effectiveness.

Figure 7:
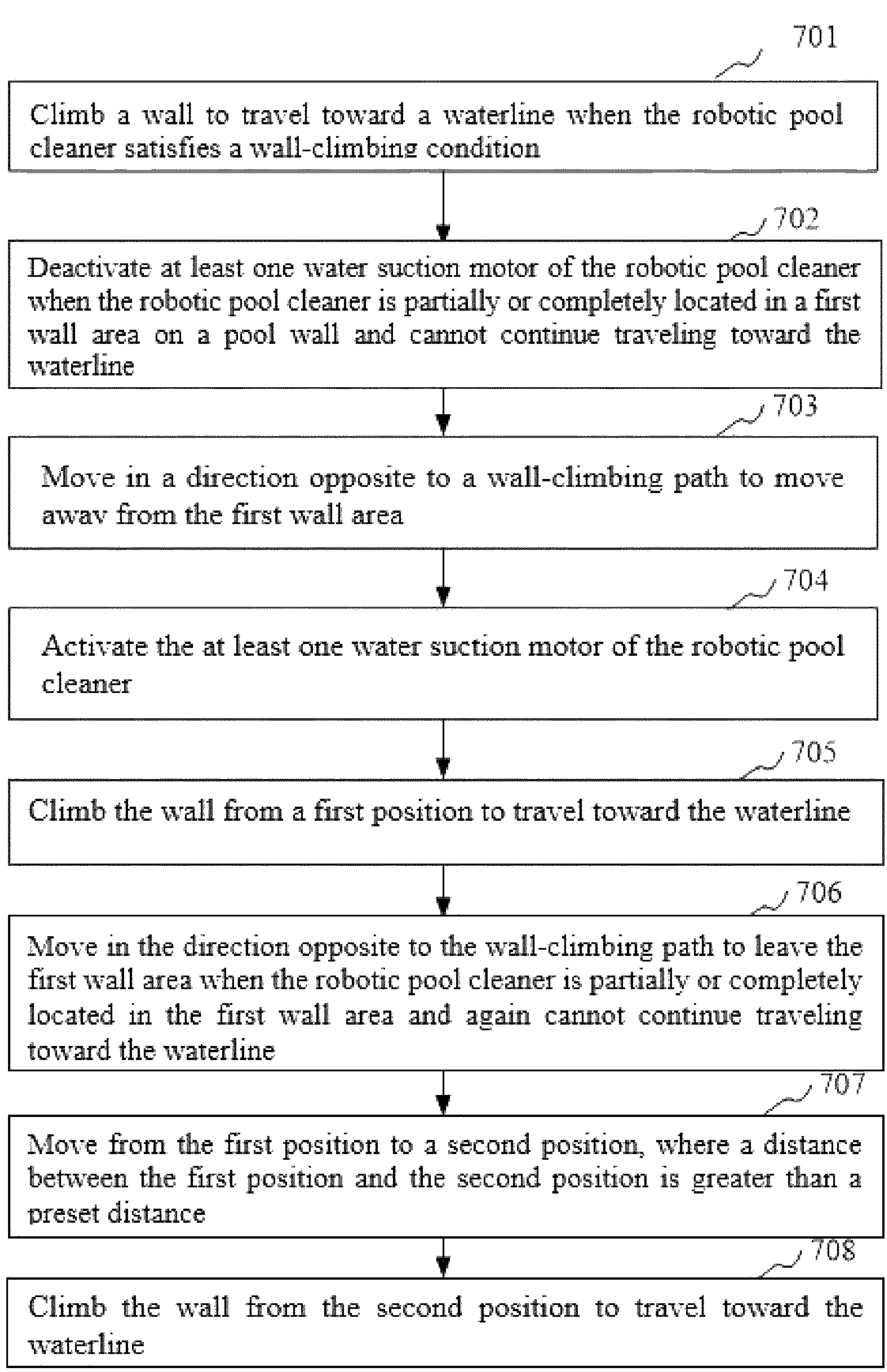
FIG. 7 is another flowchart of the control method for the robotic pool cleaner provided in an embodiment of the present application.

FIG. 7 is another flowchart of the control method for the robotic pool cleaner provided in an embodiment of the present application. This embodiment includes the following steps:

701: climbing a wall to travel toward a waterline when the robotic pool cleaner satisfies a wall-climbing condition;

702: deactivating at least one water suction motor of the robotic pool cleaner to reduce a power thereof when the robotic pool cleaner is partially or completely located in a first wall area on a pool wall and cannot continue traveling toward the waterline;

703: moving in a direction opposite to a wall-climbing path to move away from the first wall area, where after leaving the first wall area, the robotic pool cleaner reaches a first position;

704: activating the at least one water suction motor of the robotic pool cleaner;

705: climbing the wall from the first position to travel toward the waterline, where the first position is a location where the robotic pool cleaner is located after leaving the first wall area;

706: moving in the direction opposite to the wall-climbing path to leave the first wall area when the robotic pool cleaner is partially or completely located in the first wall area and again cannot continue traveling toward the waterline, where optionally, before the robotic pool cleaner moves in the opposite direction, the suction motor is deactivated;

707: moving from the first position to a second position, where a distance between the first position and the second position is greater than a preset distance; and

708: climbing the wall from the second position to travel toward the waterline.

In the embodiment shown in FIG. 7, the robotic pool cleaner cannot continue moving toward the waterline for the first time, so after moving in the opposite direction back to the first position, it begins climbing the wall again from the first position. If it still cannot continue moving toward the waterline, it moves in the opposite direction to return to the first position. Subsequently, the robotic pool cleaner changes position, i.e., it continues climbing the wall from the second position.

In FIG. 7, the robotic pool cleaner climbing the wall twice at the same position is taken as an example. However, this embodiment of the present application is not limited thereto. In other feasible implementation manners, if the robotic pool cleaner cannot move to the waterline after climbing the wall for a preset number of times at the same position, it continues climbing the wall from a different position. The preset number may be, for example, 2 times, 3 times, etc., which is not limited in this embodiment of the present application.

By adopting this solution, if the robotic pool cleaner still cannot move to the waterline after climbing the wall twice at the same position, it continues climbing the wall from a different position, increasing the probability of successful wall climbing at the same position and achieving the objective of improving cleaning effectiveness.

Optionally, in the aforementioned embodiments, the curvature of the first wall area is constant; or, the curvature of the first wall area increases at positions closer to the waterline.

In this embodiment of the present application, the curvature of the first wall area is the average curvature of all points in the first wall area. The reciprocal of the curvature K of a point in the first wall area is the radius of curvature R, i.e., R=1/K. The greater the curvature, the more curved the first wall area is.

The curvature of the first wall area being constant means that the first wall area is similar to the surface of a sphere, and the wall-climbing path is a circular arc. The distance from each point on this arc to the center of the circle is the same, i.e., all distances are equal to the radius.

The curvature of the first wall area increasing at positions closer to the waterline means that the first wall area is an irregular surface. Assuming successful wall climbing, the points on the wall-climbing path closer to the waterline correspond to smaller radii. The smaller the radius, the greater the curvature, and the more curved the first wall surface is. Referring to FIG. 2A, the black-filled circle corresponds to a larger radius, while the white-filled circle corresponds to a smaller radius, indicating that the curvature increases at positions closer to the waterline.

By adopting this solution, whether the first wall area is a surface with a constant curvature or a surface with a continuously changing and increasing curvature, the robotic pool cleaner will not repeatedly climb the wall at the same position when facing either of these highly curved surfaces. Instead, it returns along the wall-climbing path, enabling it to handle various highly curved surfaces, demonstrating strong adaptability, and allowing cleaning of various highly curved surfaces, thereby achieving the objective of improving cleaning effectiveness.

Optionally, in the aforementioned embodiments, if the robotic pool cleaner is located at the bottom of the pool wall before being partially or completely located in the first wall area on the pool wall, then the robotic pool cleaner is located at the bottom of the pool wall after leaving the first wall area.

Referring to FIGS. 2A, 4, and 5, the pool wall includes a first wall area, and the purpose of the robotic pool cleaner climbing the wall is to ascend the first wall area to travel toward the waterline. In this scenario, the robotic pool cleaner begins climbing from the pool bottom toward the first wall area, meaning there is no small-curvature wall surface or vertical wall surface between the first wall area and the pool bottom.

If the robotic pool cleaner is located in a vertical area of the pool wall before being partially or completely located in the first wall area on the pool wall, then the robotic pool cleaner is located in the vertical area after leaving the first wall area.

Optionally, when the robotic pool cleaner is partially or completely located in a second wall area on the pool wall, the at least one water suction motor of the robotic pool cleaner is maintained activated and the robotic pool cleaner moves toward the waterline, where the second wall area is a vertical area, or the proportion of the robotic pool cleaner's body accommodated by a containment cavity formed by a surface of the second wall area is less than or equal to a preset proportion.

Exemplarily, in addition to containing the first wall area with a relatively large curvature, the pool wall may also contain a second wall area. The second wall area is a vertical area on the pool wall; or, the second wall area is an area with a small curvature on the pool wall. When the pool wall is not a vertical wall but has a small curvature, the pool wall may have concave or convex areas. The open cavity formed by a concave area is relatively small, accommodating a proportion of the robotic pool cleaner's body that is less than or equal to a preset proportion, for example, accommodating one-sixth of the robotic pool cleaner's body.

When the robotic pool cleaner cleans the second wall area, it activates all water suction motors and moves toward the waterline. After reaching the waterline, it returns to the pool bottom while maintaining a certain distance from the pool wall. Subsequently, the robotic pool cleaner rotates by a preset angle and travels, adjusting its posture after reaching a new position so that it is directly facing the pool wall. Next, the robotic pool cleaner continues climbing the wall from the new position, thereby traversing the pool wall and the junction between the pool wall and pool bottom, achieving cleaning of the pool wall and the junction between the pool wall and pool bottom.

Below, the cleaning processes of the robotic pool cleaner when the second wall area is a vertical area and when it is a small-curvature area will be described respectively.

Figure 8A:
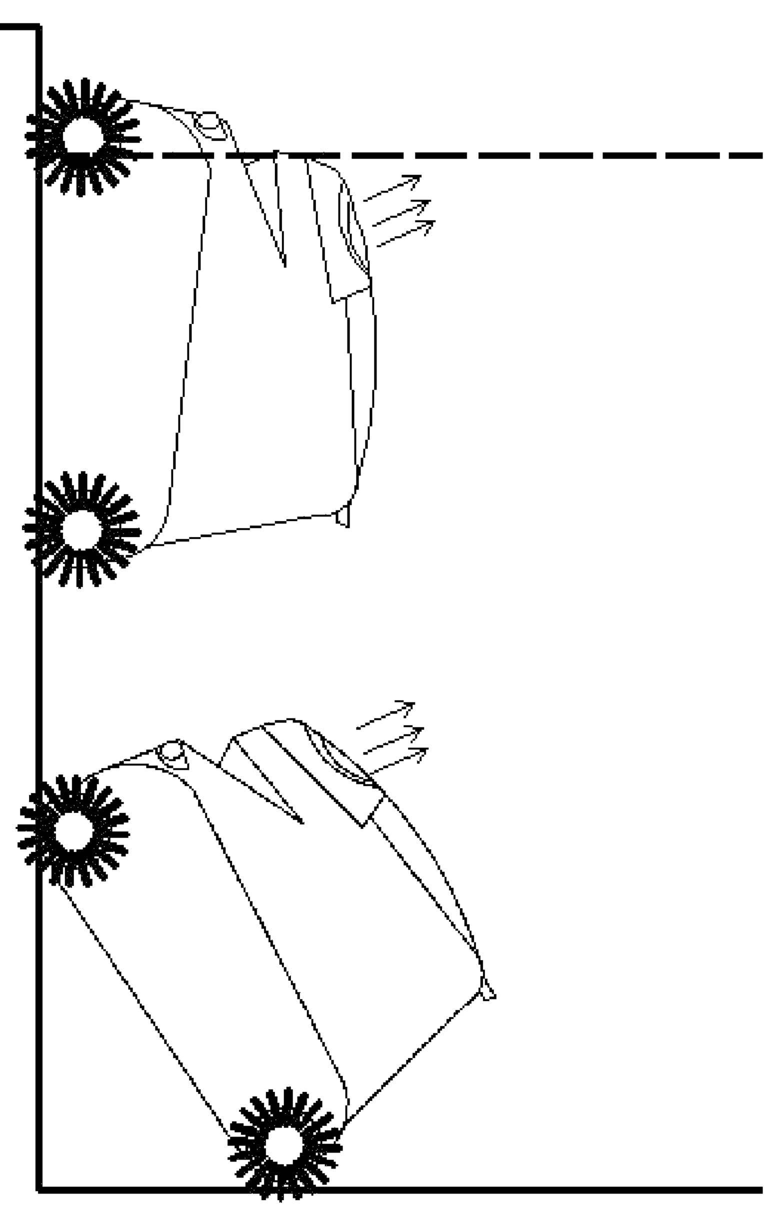
FIG. 8A is a schematic diagram of yet another scenario of the control method for the robotic pool cleaner provided in an embodiment of the present application.

FIG. 8A is a schematic diagram of yet another scenario of the control method for the robotic pool cleaner provided in an embodiment of the present application. Referring to FIG. 8A, the second wall area is a vertical area. The water suction motor of the robotic pool cleaner is activated, creating a negative pressure between the bottom of the robotic pool cleaner and the pool bottom or pool wall. Under the effect of this negative pressure, the robotic pool cleaner adheres to the pool bottom or pool wall and travels, preventing it from falling off the pool wall. After reaching the waterline, the robotic pool cleaner deactivates the water suction motor and returns from the waterline to the pool bottom.

Figure 8B:
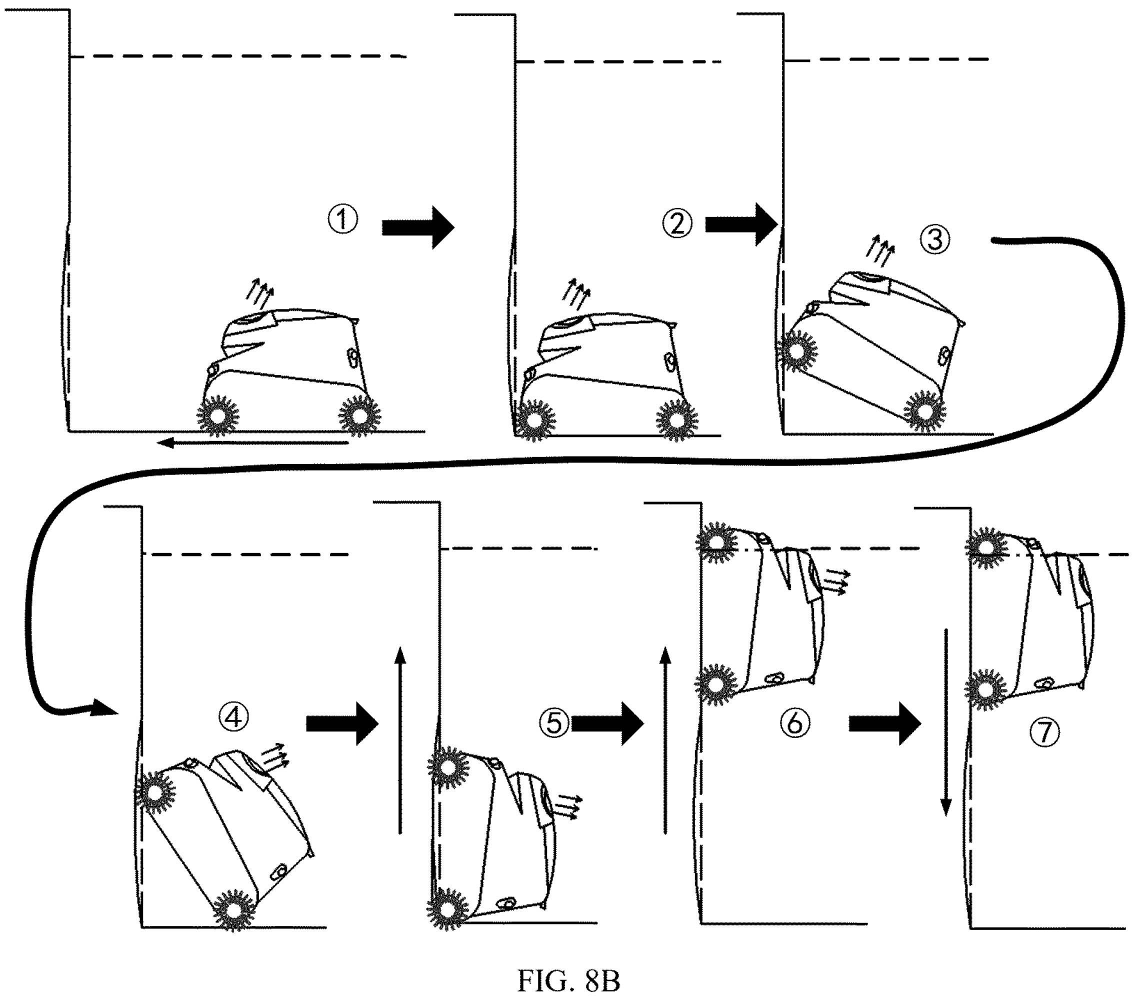
FIG. 8B is a schematic diagram of yet another scenario of the control method for the robotic pool cleaner provided in an embodiment of the present application.

FIG. 8B is a schematic diagram of yet another scenario of the control method for the robotic pool cleaner provided in an embodiment of the present application. FIG. 8 includes seven sub-figures, where the dashed line represents a hypothetical vertical area, and the solid line next to the dashed line represents an actual small-curvature area. In Sub-FIG. 1), the robotic pool cleaner is relatively far from the second wall area and travels forward to approach the second wall area. In Sub-FIG. 2), the robotic pool cleaner arrives directly in front of the second wall area, thereby satisfying the wall-climbing condition. In Sub-FIGS. 3) and 4), the robotic pool cleaner is climbing the wall but has not yet ascended onto the second wall area. In Sub-FIG. 5), the robotic pool cleaner ascends onto the second wall area, with the entire robotic pool cleaner leaving the pool bottom. In Sub-FIG. 6), the robotic pool cleaner reaches the waterline position. In Sub-FIG. 7), the robotic pool cleaner descends the wall to return from the waterline. In Sub-FIGS. 1) to 6), the water suction motor is activated; in Sub-FIG. 7), the water suction motor is deactivated.

By adopting this solution, the robotic pool cleaner keeps the water suction motor activated when climbing vertical walls and small-curvature walls, and keeps the water suction motor deactivated when descending walls, achieving the objective of rapidly cleaning vertical walls and small-curvature walls.

In the following embodiment, the first wall area is a concave area with a large curvature, and the second wall area is a vertical area or a concave area with a small curvature. Below, the cleaning process of the robotic pool cleaner will be described in detail when the pool wall includes a third wall area and a preset wall-climbing path is formed by the surface of the third wall area as a convex area with a large curvature.

Figure 9:
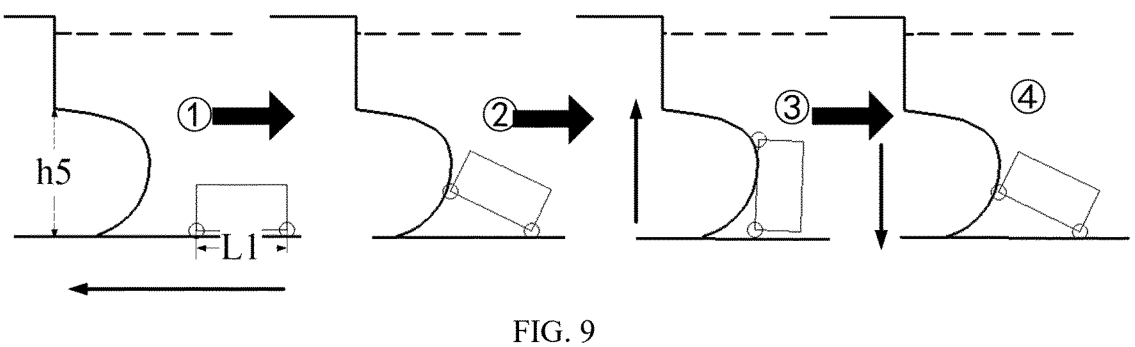
FIG. 9 is a schematic diagram of yet another scenario of the control method for the robotic pool cleaner provided in an embodiment of the present application.

FIG. 9 is a schematic diagram of yet another scenario of the control method for the robotic pool cleaner provided in an embodiment of the present application. In FIG. 9, a third wall area exists on the pool wall. The surface of the third wall area forms a preset wall-climbing path and a protrusion, and the height of this protrusion is greater than the length L1 of the robotic pool cleaner.

Referring to Sub-FIG. 1) of FIG. 9, the robotic pool cleaner travels toward the third wall area. When the distance between the robotic pool cleaner and the third wall area is less than or equal to a preset distance, and the robotic pool cleaner is perpendicular to the third wall area, the robotic pool cleaner satisfies the wall-climbing condition and begins climbing the wall. In Sub-FIG. 2), the front roller brush of the robotic pool cleaner climbs onto the preset wall-climbing path formed by the surface of the third wall area, but the rear roller brush or the end thereof remains on the pool bottom. In Sub-FIG. 3), the robotic pool cleaner continues climbing the wall, with both the front and rear roller brushes directly facing the third wall area. Subsequently, the robotic pool cleaner cannot continue traveling toward the waterline, so it moves in the direction opposite to the wall-climbing path to move away from the third wall area, as shown in Sub-FIG. 4).

By adopting this solution, for the preset wall-climbing path formed by the surface of the convex third wall area, after the robotic pool cleaner climbs the wall, when the robotic pool cleaner's body is partially or completely located on the third wall area and cannot continue traveling toward the waterline, it moves in the direction opposite to the wall-climbing path to move away from the third wall area, thereby cleaning at least a portion of the pool wall, such as through the front roller brush 14 shown in FIG. 2A, to complete the cleaning task as much as possible, achieving the objectives of improving cleaning efficiency and reducing energy consumption.

The following will describe the apparatus embodiments of the present application, which may be used to execute the method embodiments of the present application. For details not disclosed in the apparatus embodiments of the present application, reference may be made to the method embodiments of the present application.

Figure 10:
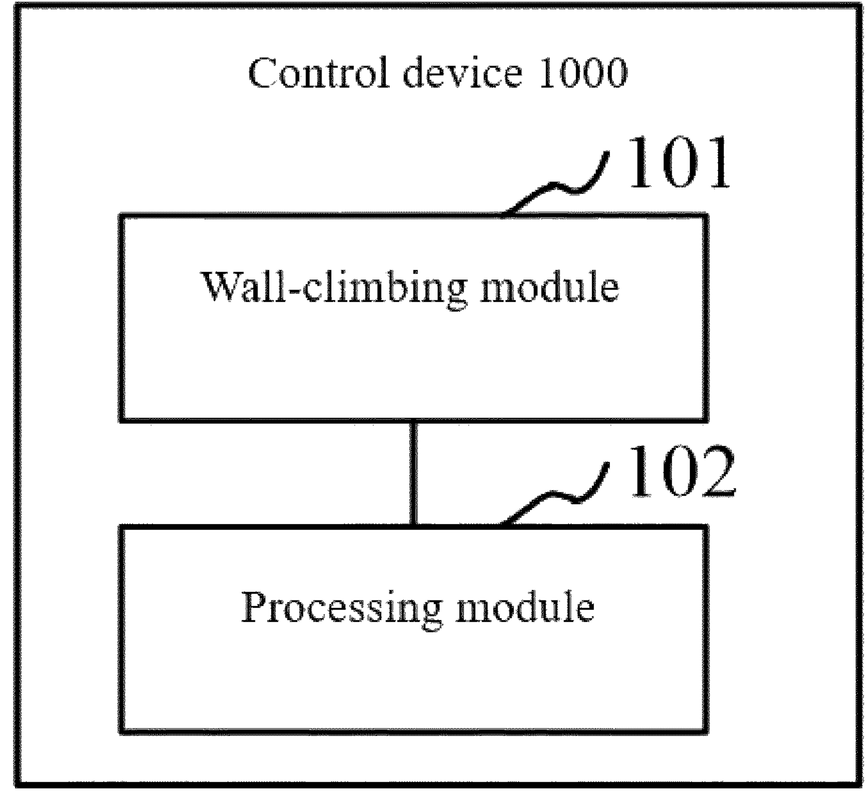
FIG. 10 is a schematic diagram of a control device provided in an embodiment of the present application.

FIG. 10 is a schematic diagram of a control device provided in an embodiment of the present application. The control device 1000 includes: a wall-climbing module 101 and a processing module 102.

The wall-climbing module 101 is configured to control the robotic pool cleaner to climb a wall to travel toward a waterline when the robotic pool cleaner satisfies a wall-climbing condition; and the processing module 102 is configured to control the robotic pool cleaner to move in a direction opposite to a wall-climbing path to move away from a first wall area when the robotic pool cleaner is partially or completely located in the first wall area on a pool wall and cannot continue traveling toward the waterline;

where a surface of the first wall area forms an open cavity on the pool wall, the open cavity is capable of accommodating at least a portion of the robotic pool cleaner's body, and the portion of the body accounts for a proportion greater than a preset proportion of the robotic pool cleaner's body.

The robotic pool cleaner 100 is equipped with the control device 1000. The control device 1000 can either be part of the internal structure of the robotic pool cleaner 100 or be independent of the robotic pool cleaner 100. When the control device 1000 is independent of the robotic pool cleaner, it can be wirelessly connected to the robotic pool cleaner. The control device can be used to control the movement of the traveling assemblies 11, including but not limited to wall climbing. Specifically, the wall-climbing module 101 can control the wall climbing of the traveling assemblies 11 and the processing module 102 can control the reverse movement of the traveling assemblies 11.

In a feasible implementation manner, a curvature of the first wall area is constant; or, the curvature of the first wall area increases at positions closer to the waterline.

In a feasible implementation manner, after the robotic pool cleaner leaves the first wall area, the processing module 102 is further configured to control the robotic pool cleaner to move from a first position to a second position, and to climb the wall from the second position to travel toward the waterline. The first position is a location where the robotic pool cleaner is located after leaving the first wall area, and a distance between the first position and the second position is greater than a preset distance.

In a feasible implementation manner, when the robotic pool cleaner is partially or completely located in the first wall area on the pool wall and cannot continue moving toward the waterline, before controlling the robotic pool cleaner to move in the direction opposite to the wall-climbing path to move away from the first wall area, the processing module 102 is further configured to deactivate at least one water suction motor of the robotic pool cleaner.

In a feasible implementation manner, when the robotic pool cleaner is partially or completely located in the first wall area on the pool wall and cannot continue moving toward the waterline, after controlling the robotic pool cleaner to move in the direction opposite to the wall-climbing path to move away from the first wall area, the processing module 102 is further configured to: activate at least one water suction motor of the robotic pool cleaner; control the robotic pool cleaner to climb the wall from a first position to travel toward the waterline, where the first position is a location where the robotic pool cleaner is located after leaving the first wall area or the third wall area; control the robotic pool cleaner to move in the direction opposite to the wall-climbing path to leave the first wall area or the third wall area when the robotic pool cleaner is partially or completely located in the first wall area and again cannot continue moving toward the waterline; and control the robotic pool cleaner to move from the first position to a second position and climb the wall from the second position to travel toward the waterline, where a distance between the first position and the second position is greater than a preset distance.

In a feasible implementation manner, when the robotic pool cleaner satisfies the wall-climbing condition, after the wall-climbing module 101 controls the robotic pool cleaner to climb the wall to travel toward the waterline, when the robotic pool cleaner is partially or completely located in a second wall area on the pool wall, the processing module 102 is further configured to maintain at least one water suction motor of the robotic pool cleaner activated and to control the robotic pool cleaner to move toward the waterline, where the second wall area is a vertical area, or a proportion of the robotic pool cleaner's body accommodated by a containment cavity formed by a surface of the second wall area is less than or equal to a preset proportion.

In a feasible implementation manner, if the robotic pool cleaner is located in a vertical area of the pool wall before being partially or completely located in the first wall area or the third wall area on the pool wall, then the robotic pool cleaner is located in the vertical area after leaving the first wall area or the third wall area; or if the robotic pool cleaner is located at a bottom of the pool wall before being partially or completely located in the first wall area or the third wall area on the pool wall, then the robotic pool cleaner is located at the bottom of the pool wall after leaving the first wall area or the third wall area.

An embodiment of the present application further provides a computer-readable storage medium, where the computer-readable storage medium stores a computer instruction, and when executed by a processor, the computer instruction is caused to implement the above-described control method for the robotic pool cleaner.

An embodiment of the present application further provides a computer program product, including a computer program, and when executed by a processor, the computer program implements the above-described control method for the robotic pool cleaner.

After considering the specification and practicing this disclosure, those skilled in the art will easily come up with other embodiments of the present application. The present application is intended to cover any variations, uses, or adaptations thereof that follow the general principles of the present application and include common knowledge or customary technical means in the art that are not disclosed herein. The specification and embodiments should be considered exemplary only, and the true scope and spirit of the present application are indicated by the following claims.

What is claimed is:

1. A control method for a robotic pool cleaner, wherein when performing a pool wall cleaning task and satisfying a wall-climbing condition, the robotic pool cleaner travels in a wall-climbing path toward a waterline, wherein the pool wall cleaning task is associated with a non-planar pool wall to be cleaned; and when partially or completely located in a first wall area on the non-planar pool wall and unable to further travel in the wall-climbing path toward the waterline, the robotic pool cleaner moves in a direction opposite to the wall-climbing path, thereby cleaning at least part of the first wall area and reducing repeated attempts to climb through the first wall area, wherein when the wall-climbing path passes through an open cavity formed on a surface of the first wall area, and a proportion of the robotic pool cleaner's body that the open cavity is capable of accommodating is greater than a preset proportion of the robotic pool cleaner's body, the robotic pool cleaner is unable to further travel in the wall-climbing path toward the waterline.

2. The method of claim 1, wherein the surface of the first wall area has a constant curvature; or, the curvature becomes greater when the surface of the first wall area is closer to the waterline.

3. The method of claim 1, wherein after leaving the first wall area when moving in the direction opposite to the wall-climbing path, the robotic pool cleaner moves from a first position to a second position, wherein the first position is a location where the robotic pool cleaner is located after leaving the first wall area, and a distance between the first position and the second position is greater than a preset distance; and the robotic pool cleaner climbs the wall from the second position to travel toward the waterline.

4. The method of claim 1, wherein before the robotic pool cleaner moves in the direction opposite to the wall-climbing path when partially or completely located in the first wall area on the pool wall and failing to further travel toward the waterline, the method further comprises:

reducing a power of at least one water suction motor of the robotic pool cleaner.

5. The method of claim 1, wherein after the robotic pool cleaner moves in the direction opposite to the wall-climbing path when partially or completely located in the first wall area on the pool wall and failing to further travel toward the waterline, the method further comprises:

activating the at least one water suction motor of the robotic pool cleaner, wherein the robotic pool cleaner climbs the wall from a first position to travel toward the waterline, wherein the first position is a location where the robotic pool cleaner is located after leaving the first wall area;

the robotic pool cleaner moves in the direction opposite to the wall-climbing path to leave the first wall area when partially or completely located in the first wall area and again failing to further travel toward the waterline;

the robotic pool cleaner moves from the first position to a second position, wherein a distance between the first position and the second position is greater than a preset distance; and the robotic pool cleaner climbs the wall from the second position to travel toward the waterline.

6. The method of claim 1, wherein the method further comprises:

when the robotic pool cleaner is partially or completely located in a second wall area on the pool wall, maintaining the at least one water suction motor of the robotic pool cleaner activated and causing the robotic pool cleaner to move in the wall-climbing path toward the waterline, wherein the second wall area is a vertical area, or comprises a surface forming a containment cavity configured to accommodate the robotic pool cleaner's body with a proportion of the robotic pool cleaner's body receivable therein less than or equal to a preset proportion.

7. The method of claim 1, wherein if the robotic pool cleaner is located in a vertical area of the pool wall before being partially or completely located in the first wall area on the pool wall, then the robotic pool cleaner is located in the vertical area after leaving the first wall area; or if the robotic pool cleaner is located at a bottom of the pool wall before being partially or completely located in the first wall area on the pool wall, then the robotic pool cleaner is located at the bottom of the pool wall after leaving the first wall area.

8. A control method for a robotic pool cleaner, wherein when performing a pool wall cleaning task and satisfying a wall-climbing condition, the robotic pool cleaner travels in a wall-climbing path toward a waterline, wherein the pool wall cleaning task is associated with a non-planar pool wall to be cleaned; and when partially or completely located on a wall area on the non-planar pool wall and unable to further travel in the wall-climbing path toward the waterline, the robotic pool cleaner moves in a direction opposite to the wall-climbing path, thereby cleaning at least part of the wall area and reducing repeated attempts to climb through the wall area, wherein when the wall-climbing path passes a protrusion formed on a surface of the wall area, and when a height of the protrusion is greater than a preset proportion of a length of the robotic pool cleaner, the robotic pool cleaner is unable to further travel in the wall-climbing path toward the waterline.

9. The method of claim 8, wherein when able to further travel in the wall-climbing path toward the waterline, the robotic pool cleaner continues to travel in the wall-climbing path toward the waterline, wherein when the height of the protrusion is equal to or smaller than a preset proportion of a length of the robotic pool cleaner, the robotic pool cleaner is able to further travel in the wall-climbing path toward the waterline.

10. The method of claim 8, wherein when the height of the protrusion is greater than the length of the robotic pool cleaner, the robotic pool cleaner is unable to further travel in the wall-climbing path towards the waterline.

11. The method of claim 8, wherein when the pool wall cleaning task is performed, the robotic pool cleaner performs a zigzag traversal on a pool wall between a pool bottom and the waterline to clean the pool wall.

12. The method of claim 8, wherein the robotic pool cleaner comprises at least one of the following:

a first sensor group disposed at a first height relative to a bottom of the robotic pool cleaner's body along a vertical direction; and a second sensor group disposed at a second height relative to the bottom of the robotic pool cleaner's body along the vertical direction, wherein the first height is less than the second height;

a first sensor group disposed at an end portion of the robotic pool cleaner's body along a forward direction of the robotic pool cleaner's body, with a first height relative to a bottom of the robotic pool cleaner's body along a vertical direction; and a second sensor group disposed at an end portion of the robotic pool cleaner's body along the forward direction of the robotic pool cleaner's body, with a second height relative to the bottom of the robotic pool cleaner's body along the vertical direction, wherein the first height is less than the second height;

a front roller brush disposed at a front end of the robotic pool cleaner's body and configured to clean, such that when the robotic pool cleaner is partially or completely located in first wall area and/or when the robotic pool cleaner moves in a direction opposite to the wall-climbing path, the wall area or the protrusion is at least partially cleaned;

two cleaning front roller brushes disposed on both sides of a vertical central axis of the robotic pool cleaner's body respectively, wherein a gap exists between the two front roller brushes, thereby allowing water flow to pass through; or a first filter chamber and a second filter chamber disposed inside the robotic pool cleaner's body, wherein the first filter chamber has larger mesh openings than the second filter chamber.

13. A robotic pool cleaner, capable of executing the method of claim 1 and comprising:

a body having a forward direction;

a sensor disposed at a preset height relative to a bottom of the body along a vertical direction; and a front roller brush rotatably disposed at a front end of the bottom of the body.

14. The method of claim 1, wherein when able to further travel in the wall-climbing path toward the waterline, the robotic pool cleaner continues to travel in the wall-climbing path toward the waterline, wherein when the open cavity is not formed or the proportion of the robotic pool cleaner's body that the open cavity is capable of accommodating is equal to or smaller than the preset proportion of the robotic pool cleaner's body, the robotic pool cleaner is able to further travel in the wall-climbing path toward the waterline.

15. The method of claim 1, wherein when the open cavity is formed and the proportion of the robotic pool cleaner's body that the open cavity is capable of accommodating is greater than the preset proportion of the robotic pool cleaner's body, the open cavity comprises at least one of the following:

a ratio between a length L2 of horizontal aperture of the open cavity and a length L1 of the robotic pool cleaner that is greater than or equal to a preset ratio;

a ratio between a depth h3 of a deepest point of the open cavity and a height h4 of a vertical aperture of the open cavity that is greater than or equal to a preset ratio; or a depth h3 of a deepest point of the open cavity that is greater than a height H of the robotic pool cleaner.

16. The method of claim 1, wherein the preset ratio is one-third or one-quarter.

17. The method of claim 1, wherein the robotic pool cleaner comprises at least one of the following:

a first sensor group disposed at a first height relative to a bottom of the robotic pool cleaner's body along a vertical direction; and a second sensor group disposed at a second height relative to the bottom of the robotic pool cleaner's body along the vertical direction, wherein the first height is less than the second height;

a first sensor group disposed at an end portion of the robotic pool cleaner's body along a forward direction of the robotic pool cleaner's body, with a first height relative to a bottom of the robotic pool cleaner's body along a vertical direction; and a second sensor group disposed at an end portion of the robotic pool cleaner's body along the forward direction of the robotic pool cleaner's body, with a second height relative to the bottom of the robotic pool cleaner's body along the vertical direction, wherein the first height is less than the second height;

a front roller brush disposed at a front end of the robotic pool cleaner's body and configured to clean, such that when the robotic pool cleaner is partially or completely located in the first wall area and/or when the robotic pool cleaner moves in the direction opposite to the wall-climbing path, the first wall area or the open cavity is at least partially cleaned;

two cleaning front roller brushes disposed on both sides of a vertical central axis of the robotic pool cleaner's body respectively, wherein a gap exists between the two front roller brushes, thereby allowing water flow to pass through; or a first filter chamber and a second filter chamber disposed inside the robotic pool cleaner's body, wherein the first filter chamber has larger mesh openings than the second filter chamber.

18. The method of claim 17, wherein the front roller brush is further configured to clean a junction between the first pool wall and a pool bottom when the robotic pool cleaner moves away from the first pool wall in the direction opposite to the wall-climbing path.

19. The method of claim 1, wherein when the pool wall cleaning task is performed, the robotic pool cleaner performs a zigzag traversal on a pool wall between a pool bottom and the waterline to clean the pool wall.

* * * * *